United States Patent
Kobayashi et al.

(10) Patent No.: US 9,182,527 B2
(45) Date of Patent: Nov. 10, 2015

(54) METHOD FOR PRODUCING OPTICAL MEMBER AND USE OF UV-CURABLE RESIN COMPOSITION THEREFOR

(71) Applicant: Nippon Kayaku Kabushiki Kaisha, Chiyoda-ku, Tokyo (JP)

(72) Inventors: Daisuke Kobayashi, Tokyo (JP); Hayato Motohashi, Tokyo (JP); Yuichiro Matsuo, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/353,121

(22) PCT Filed: Oct. 19, 2012

(86) PCT No.: PCT/JP2012/006713
§ 371 (c)(1),
(2) Date: Apr. 21, 2014

(87) PCT Pub. No.: WO2013/057959
PCT Pub. Date: Apr. 25, 2013

(65) Prior Publication Data
US 2014/0256842 A1    Sep. 11, 2014

(30) Foreign Application Priority Data
Oct. 21, 2011    (JP) .................................. 2011-231506

(51) Int. Cl.
*C08F 2/46* (2006.01)
*C08G 61/04* (2006.01)
*G02B 5/20* (2006.01)
*B32B 7/12* (2006.01)
*C08G 18/48* (2006.01)
*C08G 18/75* (2006.01)
*C08F 290/06* (2006.01)
*C09J 4/06* (2006.01)
*C09J 175/16* (2006.01)
*G06F 3/041* (2006.01)
*C09D 175/16* (2006.01)
*B32B 38/00* (2006.01)
*B32B 37/24* (2006.01)

(52) U.S. Cl.
CPC . *G02B 5/208* (2013.01); *B32B 7/12* (2013.01); *C08F 290/067* (2013.01); *C08G 18/4825* (2013.01); *C08G 18/755* (2013.01); *C09D 175/16* (2013.01); *C09J 4/06* (2013.01); *C09J 175/16* (2013.01); *G06F 3/041* (2013.01); *G06F 3/0412* (2013.01); *B32B 2037/243* (2013.01); *B32B 2038/0076* (2013.01); *B32B 2307/40* (2013.01); *B32B 2310/0831* (2013.01); *B32B 2457/20* (2013.01); *G02F 2202/28* (2013.01); *G06F 2203/04103* (2013.01)

(58) Field of Classification Search
CPC ........ G02B 5/208; B32B 7/12; B32B 7/2037; B32B 7/243; B32B 2307/40; B32B 2457/20; B32B 2038/0076; B32B 2310/083; C09J 4/06; C09J 175/16; G06F 3/041; C08F 290/06; C08F 290/067; C08G 18/4825; C08G 18/8175; C08G 18/755; C08G 18/48; C09D 175/16
USPC .................................. 522/174, 173, 1; 520/1
See application file for complete search history.

(56) References Cited

U.S. PATENT DOCUMENTS

| | | | |
|---|---|---|---|
| 7,868,990 B2 | 1/2011 | Chan et al. | |
| 7,927,533 B2 | 4/2011 | Kamiya et al. | |
| 8,087,967 B2 | 1/2012 | Shinya et al. | |
| 2006/0171627 A1 | 8/2006 | Aoki et al. | |
| 2008/0252838 A1 | 10/2008 | Chan et al. | |
| 2009/0110924 A1 | 4/2009 | Inoue et al. | |
| 2009/0186552 A1* | 7/2009 | Shinya et al. | 445/58 |
| 2010/0043965 A1* | 2/2010 | Kamiya et al. | 156/275.5 |
| 2011/0236643 A1 | 9/2011 | Tsubouchi et al. | |
| 2012/0114953 A1* | 5/2012 | Ogawa et al. | 428/423.1 |

FOREIGN PATENT DOCUMENTS

| | | |
|---|---|---|
| CN | 101285969 A | 10/2008 |
| CN | 102224445 A | 10/2011 |

(Continued)

OTHER PUBLICATIONS

Korean communication, with English translation, issued Aug. 19, 2014 in corresponding Korean patent application No. 10-2013-7034564.

(Continued)

*Primary Examiner* — Ling Choi
*Assistant Examiner* — Jessica E Whiteley
(74) *Attorney, Agent, or Firm* — Nields, Lemack & Frame, LLC

(57) ABSTRACT

The present invention relates to a method for producing an optical member wherein an optical substrate having a light-blocking part on the surface is bonded to an optical substrate for bonding. The method for producing an optical member uses a UV-curable resin composition and comprises specific (Process 1) through (Process 3). The present invention also relates to the use of a UV-curable resin composition comprising a (meth)acrylate (A) and a photopolymerization initiator (B) for the production method, and a UV-curable resin composition. It is possible to produce a bonded optical member having good curability and adhesiveness, such as a touch panel or display unit having an optical substrate comprising a light-blocking part, with good productivity but with little damage to the optical substrate. It is thereby possible to obtain an optical member having a high degree of resin curing at the light-blocking part and high reliability.

25 Claims, 4 Drawing Sheets

(56) References Cited

FOREIGN PATENT DOCUMENTS

| | | |
|---|---|---|
| EP | 2133856 A1 | 12/2009 |
| JP | 2007-156184 A | 6/2007 |
| JP | 2009-186954 A | 8/2009 |
| JP | 2009-192792 A | 8/2009 |
| JP | 2010-248387 A | 11/2010 |
| JP | 4711354 B2 | 6/2011 |
| JP | 2012-73533 A | 4/2012 |
| KR | 10-2008-0106267 A | 12/2008 |
| KR | 10-2009-0045122 A | 5/2009 |
| WO | 2008/123611 A1 | 10/2008 |
| WO | 2009/011366 A1 | 1/2009 |

OTHER PUBLICATIONS

International Search Report and Written Opinion mailed Jan. 22, 2013 in corresponding PCT application No. PCT/JP2012/006713.

International Preliminary Report on Patentability mailed May 1, 2014 in corresponding PCT application No. PCT/JP2012/006713.

Korean communication, with English translation, dated Apr. 24, 2014 in corresponding Korean patent application No. 10-2013-7034564.

Chinese communication, with English translation, issued Dec. 10, 2014 in corresponding Chinese patent application No. 201280036583.2.

Chinese communication, with English translation, issued Mar. 31, 2015 in corresponding Chinese patent application No. 201280036583.2.

European communication mailed May 6, 2015 in corresponding European patent application No. 12842131.0.

Korean communication, with English translation, issued Jun. 6, 2015 in corresponding Korean patent application No. 10-2014-7020791.

Taiwanese communication, with English translation, issued Jul. 15, 2015 in corresponding Taiwanese patent application No. 103110259.

* cited by examiner (a)

(b)

(c)

(a)

(b)

(c)

METHOD FOR PRODUCING OPTICAL MEMBER AND USE OF UV-CURABLE RESIN COMPOSITION THEREFOR

TECHNICAL FIELD

The present invention relates to a method of producing an optical member, in which an optical substrate having a light shielding portion and another optical substrate are bonded to each other, and the use of an ultraviolet curable resin composition for the method.

BACKGROUND ART

In recent years, a display device capable of screen input by bonding a touch panel to a display screen of the display device such as a liquid crystal display, a plasma display, or an organic EL display is widely used. This touch panel has a structure, in which glass plates or resin films having a transparent electrode formed thereon are bonded to one another with a slight gap, and if necessary, a transparent protective plate of glass or resin is bonded onto the touch surface.

There is a technique, in which a pressure sensitive adhesive double coated sheet is used to bond a glass plate or film having a transparent electrode formed thereon to a transparent protective plate of glass or resin in a touch panel, or to bond a touch panel to a display unit. However, there is a problem that air bubbles are easily generated when a pressure sensitive adhesive double coated sheet is used. A technique, in which a glass plate or film having a transparent electrode formed thereon is bonded to a transparent protective plate of glass or resin with an ultraviolet curable resin composition having flexibility, or a touch panel is bonded to a display unit with an ultraviolet curable resin composition having flexibility, has been suggested as an alternative technique to a pressure sensitive adhesive double coated sheet.

Meanwhile, a light shielding portion of belt shape is formed at the outermost edge of a transparent protective plate in order to improve the contrast of a display image. In a case in which the transparent protective plate having a light shielding portion formed thereon is bonded with an ultraviolet curable resin composition, insufficient ultraviolet rays reach the ultraviolet curable resin in the light shielded region, which corresponds to the shade of the light shielding portion, because of the light shielding portion, and thus the curing of the resin in the light shielded region is not sufficient. If the curing of resin is not sufficient, problems such as display unevenness in the display image near the light shielding portion occur.

As a technique to improve the curing of resin in a light shielded region, Patent Literature 1 discloses a technique, in which an organic peroxide is contained in an ultraviolet curable resin, and the resin thus obtained is irradiated with ultraviolet rays and then heated, whereby the resin in a light shielded region is cured. However, it is concerned that a heating process causes damage to a liquid crystal display device and the like. Moreover, there is a problem of poor productivity since the heating process requires generally 60 minutes or longer time to secure sufficient curing of resin. In addition, Patent Literature 2 discloses a technique, in which the resin in a light shielded region is cured by irradiating with ultraviolet rays from the outer side surface of the light shielding portion forming surface. However, there is limitation in this technique since it is sometimes difficult to irradiate the resin with ultraviolet rays from the side surface depending on the shape of a liquid crystal display device. In addition, Patent Literature 3 discloses a technique, in which slow acting property of a cationically polymerizable ultraviolet curable resin is used, but the resin after curing is poor in flexibility.

CITATION LIST

Patent Literatures

Patent Literature 1: JP 4711354 B1
Patent Literature 2: JP 2009-186954 A
Patent Literature 3: JP 2010-248387 A

SUMMARY OF INVENTION

Technical Problem

An object of the invention is to provide a method of producing an optical member using an ultraviolet curable resin composition capable of providing an optical member such as a touch panel or a display body unit causing little damage to an optical substrate and favorable in productivity, and an optical member exhibiting high cure extent of resin composition and high reliability.

Solution of Problem

The inventors have conducted intensive investigations in order to solve the problems described above, and as a result, have found out the following fact, thereby completing the invention. The problems described above is solved by producing an optical substrate having a light shielding portion and another optical substrate to be bonded thereto by a method including specific Processes 1 to 3 using an ultraviolet curable resin composition. In other words, the invention relates to the following (1) to (21).

(1)
A method of producing an optical member including at least a pair of optical substrates, in which both of a transparent optical substrate having a light shielding portion on a surface thereof and another optical substrate to be bonded to the transparent optical substrate having a light shielding portion on a surface thereof are bonded to each other through a procedure including the following Processes 1 to 3 using an ultraviolet curable resin composition, the method including:

Process 1: a process of forming a coating layer by coating the ultraviolet curable resin composition on at least either of bonding surfaces of a transparent optical substrate having a light shielding portion on a surface thereof and another optical substrate to be bonded to the transparent optical substrate having a light shielding portion on a surface thereof, and then allowing the coating layer to have a light shielded region selectively cured and the other part uncured by selectively irradiating the light shielded region, to be described below, in the coating layer thus obtained with ultraviolet rays, in which the light shielded region described above means a part of coating layer where ultraviolet rays do not reach since the part is shielded from ultraviolet rays by a light shielding portion when the two optical substrates are bonded to each other and the coating layer is irradiated with ultraviolet rays through the transparent optical substrate having a light shielding portion on the surface thereof;

Process 2: a process of bonding the two optical substrates to each other by interposing the coating layer obtained in Process 1 between the bonding surfaces of the two optical substrates; and Process 3: a process of curing the uncured coating layer, which is interposed between the two optical substrates, by irradiating a laminated body having at least a pair of optical substrates bonded to each other by Processes 1 and 2 with ultraviolet rays through the transparent optical substrate having a light shielding portion.

(2)

The method of producing an optical member according to (1) described above, the method further including the following Process 4 after Process 3;

Process 4: a process of applying pressure with respect to the optical substrates bonded to each other.

(3)

The method of producing an optical member according to (1) or (2) described above, in which the part, which is a part other than the light shielded region of the coating layer and is to remain as uncured, is masked with an ultraviolet shielding plate and irradiation with ultraviolet rays is performed when the light shielded region is cured in Process 1.

(4)

The method of producing an optical member according to any one of (1) to (3) described above, in which an irradiation dose of ultraviolet rays in Process 1 is at least 200 mJ/cm$^2$.

(5)

The method of producing an optical member according to any one of (1) to (4) described above, in which the ultraviolet curable resin composition is coated at least either a surface provided with a light shielding portion of the optical substrate having a light shielding portion on a surface thereof or a display surface of a display unit that is the optical substrate to be bonded to the optical substrate having a light shielding portion on a surface thereof, and the optical substrate having a light shielding portion on a surface thereof and the display unit are bonded to each other such that a surface of the side having a light shielding portion of the optical substrate having a light shielding portion on a surface thereof and the display surface of the display unit face each other by interposing a coating layer thus obtained in Process 1.

(6)

The method of producing an optical member according to any one of (1) to (5) described above, in which the optical substrate having a light shielding portion on a surface thereof is at least one selected from the group consisting of a transparent glass substrate having a light shielding portion, a transparent resin substrate having a light shielding portion, a glass substrate having a light shielding portion and a transparent electrode formed thereon, and the optical substrate to be bonded to the optical substrate having a light shielding portion on a surface thereof is at least one selected from the group consisting of a liquid crystal display unit, a plasma display unit, and an organic EL display unit.

(7)

The method of producing an optical member according to any one of (1) to (6) described above, in which the ultraviolet curable resin composition is an ultraviolet curable resin composition containing (A) a (meth)acrylate and (B) a photopolymerization initiator.

(8)

The method of producing an optical member according to (7) described above, in which (A) the (meth)acrylate is at least one selected from the group consisting of a urethane (meth)acrylate, a (meth)acrylate having a polyisoprene backbone, and a (meth)acrylate monomer.

(9)

The method of producing an optical member according to (7) or (8) described above, in which both of (i) a urethane (meth)acrylate or a (meth)acrylate having a polyisoprene backbone, and (ii) a (meth)acrylate monomer are included as (A) the (meth)acrylate.

(10)

The method of producing an optical member according to (8) or (9) described above, in which (A) the (meth)acrylate is a urethane (meth)acrylate having a polypropylene oxide structure or a (meth)acrylate monomer.

(11)

The method of producing an optical member according to any one of (8) to (10) described above, in which the urethane (meth)acrylate is a urethane (meth)acrylate obtained by reacting polypropylene glycol, polyisocyanate, and a hydroxyl group-containing (meth)acrylate.

(12)

The method of producing an optical member according to (8) or (9) described above, in which a weight average molecular weight of the urethane (meth)acrylate is from 7000 to 25000, and a number average molecular weight of the (meth) acrylate having a polyisoprene backbone is from 15000 to 50000.

(13)

The method of producing an optical member according to any one of (8) to (12) described above, in which the ultraviolet curable resin composition contains other components other than (A) the (meth)acrylate (B) and the photopolymerization initiator, and contains a urethane (meth)acrylate at from 20 to 80% by weight and a (meth)acrylate monomer at from 5 to 70% by weight with respect to the total amount of the ultraviolet curable resin composition as (A) the (meth)acrylate, and (B) the photopolymerization initiator at from 0.2 to 5% by weight with respect to the total amount of the ultraviolet curable resin composition, and the balance is other components.

(14)

An optical member obtained by the method of producing an optical member according to any one of (1) to (13) described above.

(15)

A touch panel obtained by the method of producing an optical member according to any one of (1) to (13) described above.

(16)

A display device, which is obtained by the method of producing an optical member according to (5) described above and has an optical substrate having a light shielding portion on a surface thereof on a display screen of a display unit.

(17)

Use of an ultraviolet curable resin composition containing (A) a (meth)acrylate and (B) a photopolymerization initiator for the method of producing an optical member according to any one of (1) to (6) described above.

(18)

The use of an ultraviolet curable resin composition according to (17) described above, in which (A) the (meth)acrylate is at least one selected from the group consisting of a urethane (meth)acrylate, a (meth)acrylate having a polyisoprene backbone, and a (meth)acrylate monomer.

(19)

The use of an ultraviolet curable resin composition according to (17) described above, in which both of (i) a urethane (meth)acrylate or a (meth)acrylate having a polyisoprene backbone and (ii) a (meth)acrylate monomer are contained as (A) the (meth)acrylate.

(20)

The use of an ultraviolet curable resin composition according to (18) or (19) described above, in which the urethane (meth)acrylate is a urethane (meth)acrylate obtained by reacting polypropylene glycol, polyisocyanate, and a hydroxyl group-containing (meth)acrylate.

(21)

An ultraviolet curable resin composition to be used in the method of producing an optical member according to any one of (1) to (13) described above, the composition including (A) a (meth)acrylate and (B) a photopolymerization initiator.

(22)

The ultraviolet curable resin composition according to (21) described above, in which (A) the (meth)acrylate is at least one selected from the group consisting of a urethane (meth)acrylate, a (meth)acrylate having a polyisoprene backbone, and a (meth)acrylate monomer.

(23)

The method of producing an optical member according to (7) described above, in which the ultraviolet curable resin composition is an ultraviolet curable resin composition further containing a softening component.

(24)

The ultraviolet curable resin composition according to (21) described above, the composition further including a softening component.

Advantageous Effects of Invention

According to the invention, a bonded optical member causing little damage to an optical substrate and exhibiting favorable productivity and excellent curability and adherence, for example, a touch panel or a display body unit having an optical substrate having a light shielding portion can be obtained. Moreover, an optical member exhibiting high cure extent of resin at a light shielding portion and high reliability, and not causing a problem such as display unevenness of the display image near a light shielding portion can be provided.

DESCRIPTION OF EMBODIMENTS

Figure 1:
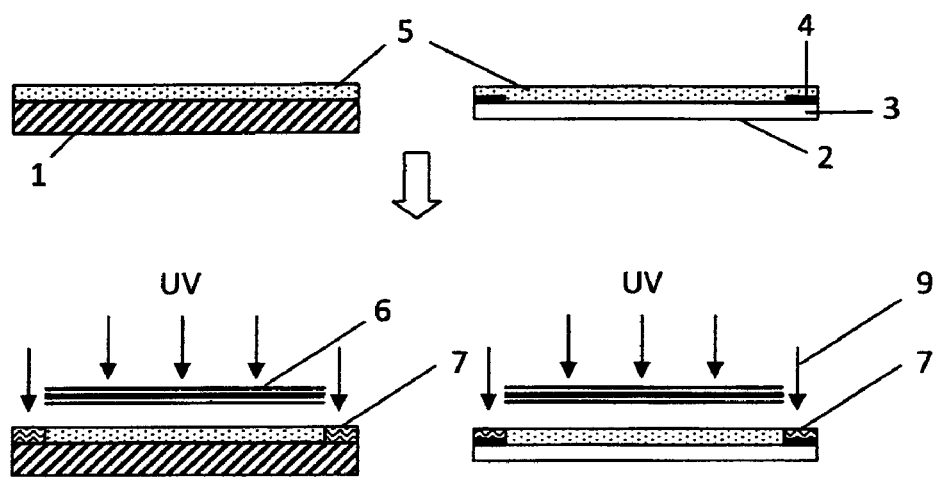
FIGS. 1(a) to 1(c) are process diagrams illustrating an embodiment (first embodiment) of the producing method according to the invention.
Figure 1:
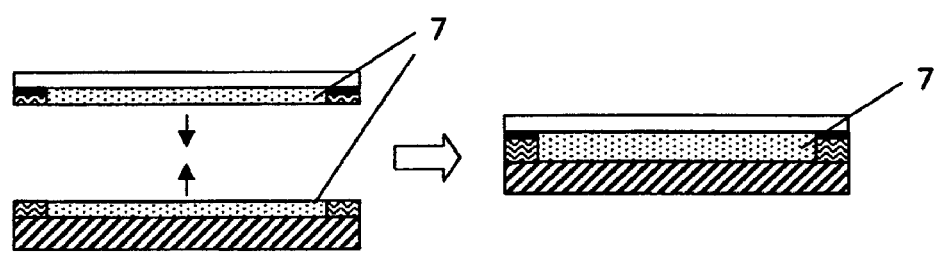
Figure 1:
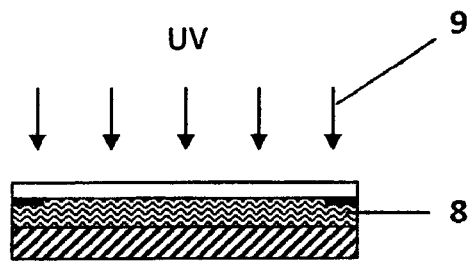

First, the producing process of an optical member using an ultraviolet curable resin composition of the invention will be described.

In the method of producing an optical member of the invention, a transparent optical substrate having a light shielding portion on the surface thereof and another optical substrate to be bonded to the transparent optical substrate having a light shielding portion on the surface thereof are bonded to each other by the following Processes 1 to 3 using an ultraviolet curable resin composition.

Process 1: a process of forming a coating layer by coating an ultraviolet curable resin composition on at least either of bonding surfaces of a transparent optical substrate having a light shielding portion on a surface thereof and another optical substrate to be bonded thereto, and then allowing the coating layer to have a light shielded region selectively cured and the other part uncured by selectively irradiating the light shielded region, to be described below, in the coating layer thus obtained with ultraviolet rays, Process 2: a process of bonding the two optical substrates to each other by interposing the coating layer obtained in Process 1 between the bonding surfaces of the two optical substrates, and Process 3: a process of curing the coating layer, which is interposed between the two optical substrates and uncured, by irradiating a laminated body having at least a pair of optical substrates bonded to each other by Processes 1 and 2 with ultraviolet rays through the transparent optical substrate having the light shielding portion.

In the present specification, the term "light shielded region" or "light shielded region at the time of bonding" means a part of coating layer, where ultraviolet rays do not reach since the part is shielded from ultraviolet rays by the light shielding portion when the two optical substrates are bonded to each other and the coating layer is irradiated with ultraviolet rays through the transparent optical substrate having a light shielding portion on the surface thereof.

Hereinafter, specific embodiments of the method of producing an optical member through Process 1 to Process 3 of the invention will be described by exemplifying a case, in which a liquid crystal display unit and a transparent substrate having a light shielding portion are bonded to each other, with reference to drawings.

First Embodiment

FIGS. 1(a) to 1(c) are process diagrams illustrating the first embodiment of the method of producing an optical member using an ultraviolet curable resin composition according to the invention.

This first embodiment is a method of obtaining an optical member (a liquid crystal display unit having a light shielding portion) by bonding a liquid crystal display unit 1 to a transparent substrate 2 having a light shielding portion.

The liquid crystal display unit 1 is a liquid crystal display unit prepared by enclosing a liquid crystal material between a pair of substrates having an electrode formed thereon and then equipping the pair of substrates with a polarizing plate, a driving circuit, a signal input cable, and a backlight unit.

The transparent substrate 2 having a light shielding portion is a transparent substrate prepared by forming a light shielding portion 4 of black frame shape on the surface of the bonding surface of a transparent substrate 3 such as a glass plate, a polymethyl methacrylate (PMMA) plate, a polycarbonate (PC) plate, or an alicyclic polyolefin polymer (COP) plate.

Here, the light shielding portion 4 is formed by gluing tape, coating a coating, printing, or the like.

(Process 1)

First, as illustrated in FIG. 1(a), an ultraviolet curable resin composition is coated on the surface of the display surface of the liquid crystal display unit 1 and the surface provided with a light shielding portion of the transparent substrate 2 having a light shielding portion, respectively. As the coating method, a method using a slit coater, a roll coater, a spin coater, or a screen printing method is exemplified. Here, the ultraviolet curable resin compositions coated on the surface of the liquid display unit 1 and the surface of the transparent substrate 2 having a light shielding portion may be the same as each other, or different ultraviolet curable resin compositions may be used. It is generally preferable that the ultraviolet curable resin compositions used for both surfaces be the same as each other.

The film thickness of the cured product of each of the ultraviolet curable resin compositions is adjusted such that the cured product layer of resin 7 after bonding is from 50 to 500 μm, preferably from 50 to 350 μm, and further preferably from 100 to 350 μm.

The light shielded region (the part of coating layer, which is in the light shielded region shielded from ultraviolet rays by the light shielding portion when the laminated body including the liquid crystal display unit 1 and the transparent substrate 2 having a light shielding portion bonded to each other is irradiated with ultraviolet rays from the side of the transparent substrate 2 having a light shielding portion) at the time of bonding in a coating layer 5 of ultraviolet curable resin composition after coating is selectively irradiated with ultraviolet rays, thereby obtaining a coating layer 7 of ultraviolet curable resin composition having the light shielded region at the time of bonding selectively cured. At this time, the region exposed to light at the time of bonding is masked with an ultraviolet shielding plate when the coating layer is irradiated with ultraviolet rays such that the region exposed to light (the part of coating layer exposed to ultraviolet rays when the laminated body including the two optical substrates bonded to each other is irradiated with ultraviolet rays from the side of the transparent substrate 2 having a light shielding portion) at the time of bonding is not cured.

The irradiation dose of ultraviolet rays at this time is preferably 200 mJ/cm$^2$ or more, and particularly preferably 1000 mJ/cm$^2$ or more. If the irradiation dose is too little, insufficient cure extent of the part of light shielding portion of the optical member bonded in the end is concerned. The upper limit of the irradiation dose of ultraviolet rays is not particularly limited, but is preferably 4000 mJ/cm$^2$ or less, and more preferably 3000 mJ/cm$^2$ or less.

With regard to the light source used in the irradiation with ultraviolet rays from ultraviolet to near-ultraviolet, any kind of light source may be used if a light source is a lamp emitting a light beam of from ultraviolet to near-ultraviolet. Examples thereof include a low pressure mercury lamp, a high pressure mercury lamp, or an extra-high pressure mercury lamp, a metal halide lamp, a (pulse)xenon lamp, or an electrodeless lamp.

Here, the technique, in which only the resin composition in the light shielded region is selectively irradiated with ultraviolet rays but the region exposed to light at the time of bonding is not irradiated, is explained by exemplifying a technique, in which the region exposed to light is masked with an ultraviolet shielding plate in the present embodiment, but the technique to selectively irradiate the light shielded region with ultraviolet rays is not limited to the present technique. The method is not particularly limited but any method can be adopted as long as a method is capable of selectively curing the light shielded region. For example, a method, in which the shape of the light source of the ultraviolet irradiator is the same as the shape of the light shielding portion, or a method (a method using spot UV), in which light source is designed such that the ultraviolet rays are concentrated at a specific position through an optical fiber and the light shielded region is scanned with the concentrated ultraviolet rays, can be adopted. The method using an ultraviolet shielding plate is more preferable from the viewpoint of being simple.

In Process 1, the irradiation with ultraviolet rays is performed from the surface of the upper side (the opposite side to the liquid crystal display unit side or the opposite side to the transparent substrate side when seen from the ultraviolet curable resin composition) (generally the surface of the atmosphere side) of the coating layer. The irradiation with ultraviolet rays can be performed in the air, or depending on the purpose, the irradiation with ultraviolet rays may be performed in a vacuum, or in the presence or absence of a curing inhibitory gas such as oxygen or ozone under reduced pressure or normal pressure. In addition, depending on the purpose, the irradiation with ultraviolet rays may be performed while spraying a curing inhibitory gas or an inert gas upon the upper surface of the coating layer after evacuating. The opposite side to the liquid crystal display unit side or the opposite side to the transparent substrate side is the atmosphere side in a case in which the resin composition in the light shielded region is cured in the air.

The irradiation with ultraviolet rays is preferably performed on the upper surface of the coating layer in the air or in the presence of a curing inhibitory gas such as oxygen and ozone from the viewpoint of preserving the stickiness and improving adhesiveness of the surface of the coating layer in the light shielded region.

(Process 2)

Next, the liquid crystal display unit 1 and the transparent substrate 2 having a light shielding portion are bonded to each other as illustrated in FIG. 1 (b) in the form that the coating layers 7 (coating layer of the ultraviolet curable resin composition having a light shielded region at the time of bonding selectively cured) face each other. The bonding can be performed in the air or in a vacuum.

Here, it is suitable to perform bonding in a vacuum in order to prevent air bubbles from being generated at the time of bonding.

As described above, the improvement in adhesive force can be expected if a coating layer 7 of the ultraviolet curable resin composition having a light shielded region cured for each of the liquid crystal display unit 1 and the transparent substrate 2 is prepared, and then the liquid crystal display unit 1 and the transparent substrate 2 are bonded to each other.

(Process 3)

Next, as illustrated in FIG. 1 (c), the ultraviolet curable resin composition layer (coating layer) is cured by irradiating the optical member obtained by bonding the transparent substrate 2 and the liquid crystal display unit 1 to each other with ultraviolet rays 9 from the side of the transparent substrate 2 having a light shielding portion.

The irradiation dose of ultraviolet rays is preferably about from 100 to 4000 mJ/cm$^2$, and particularly preferably about from 200 to 3000 mJ/cm$^2$ in Process 3. With regard to the light source used for curing by the irradiation with light beam of from ultraviolet to near-ultraviolet, any kind of light source may be used if a light source is a lamp emitting a light beam of from ultraviolet to near-ultraviolet. Examples thereof include a low pressure mercury lamp, a high pressure mercury lamp, or an extra-high pressure mercury lamp, a metal halide lamp, a (pulse)xenon lamp, or an electrodeless lamp.

Figure 4:
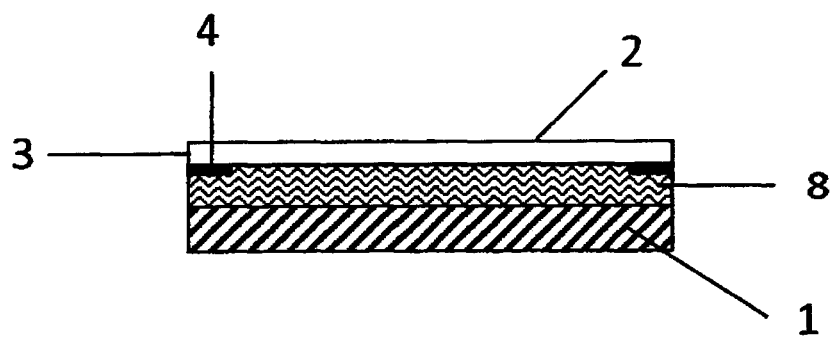
FIG. 4 is a schematic drawing of an optical member obtained by the invention.

In this manner, an optical member as illustrated in FIG. 4 can be obtained.

(Process 4)

Moreover, if necessary, the adhesion of the optical member thus obtained can be increased by applying pressure thereto as the (Process 4). The adhesive force of the cured product layer in the light shielded region at the time of bonding is improved if pressure is applied. By virtue of this, at the time of bonding the liquid crystal display unit 1 and the transparent substrate 2, the effect that the separation at the interface between the coating layers 7, which are adhered to each other, by external pressure or an environmental change is prevented can be expected. In addition, the adhesive force of the cured product layer of resin 8 with respect to the liquid crystal display unit 1 or the transparent substrate 2 having a light shielding portion is also further increased.

Hence, it is preferable to include Process 4.

Second Embodiment

FIGS. 2(a) to 2(c) are process diagrams illustrating the second embodiment of the method of producing an optical member using an ultraviolet curable resin composition according to the invention.

Meanwhile, the same reference numerals in the figures refer to the same elements as the constitutional elements in the first embodiment described above, and the explanation thereof will not be repeated here.

(Process 1)

Figure 2:
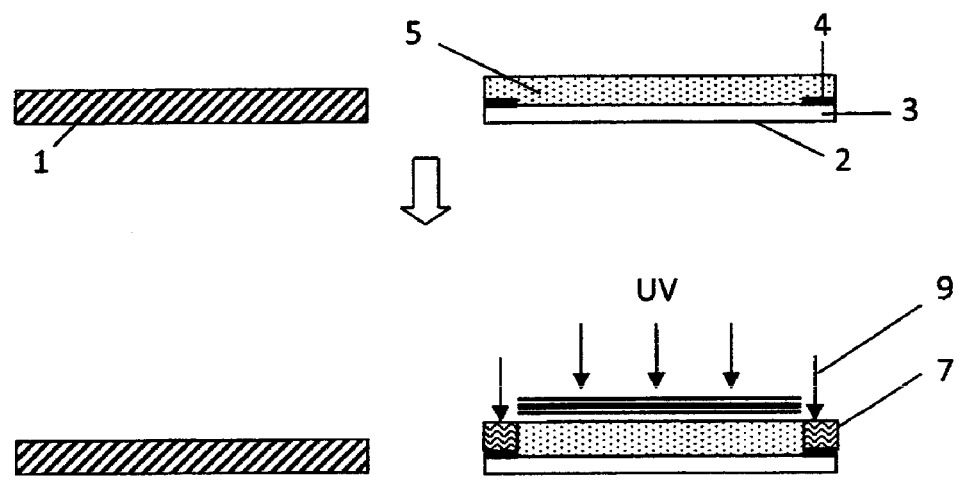
FIGS. 2(a) to 2(c) are process diagrams illustrating another embodiment (second embodiment) of the producing method according to the invention.
Figure 2:
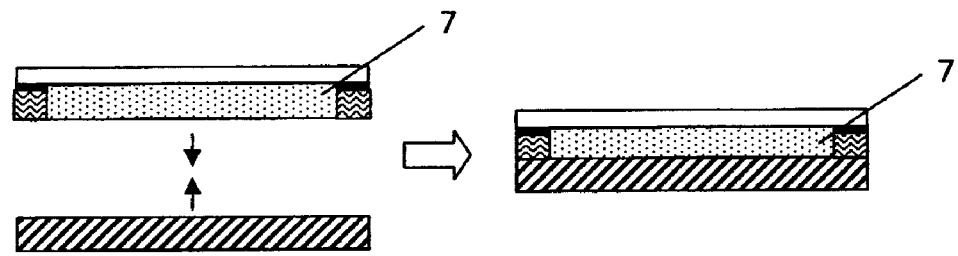
Figure 2:
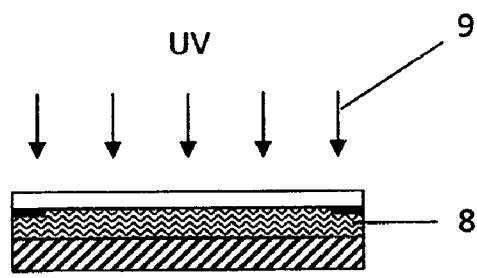

First, as illustrated in FIG. 2 (*a*), an ultraviolet curable resin composition is coated on the surface provided with a light shielding portion 4 of a transparent substrate 2 having a light shielding portion. Thereafter, a coating layer 7 of the ultraviolet curable resin composition having a light shielded region at the time of bonding cured is obtained by irradiating the light shielded region at the time of bonding with ultraviolet rays. Here, the region exposed to light at the time of bonding is masked with an ultraviolet shielding plate 6, whereby the resin composition in the region exposed to light is not cured when irradiation with ultraviolet rays is performed.

(Process 2)

Next, as illustrated in FIG. 2 (*b*), the liquid crystal display unit 1 and a transparent substrate 2 having a light shielding portion are bonded to each other in the form that the coating layer 7 of the transparent substrate 2 having a light shielding portion and the display surface of a liquid crystal display unit 1 face each other. The bonding can be performed in the air or in a vacuum.

(Process 3)

Next, as illustrated in FIG. 2 (*c*), the ultraviolet curable resin composition in the region exposed to light at the time of bonding is cured by irradiating the optical member obtained by bonding the transparent substrate 2 and the liquid crystal display unit 1 to each other with ultraviolet rays 9 from the side of the transparent substrate 2 having a light shielding portion.

In this manner, an optical member illustrated in FIG. 4 can be obtained.

Third Embodiment

The optical member of the invention can be produced according to the third embodiment modified as follows in addition to the first embodiment and the second embodiment.

(Process 1)

First, an ultraviolet curable resin composition is coated on the display surface of a liquid crystal display unit 1, and then a coating layer 7 of the ultraviolet curable resin composition having a light shielded region at the time of bonding cured is obtained by irradiating the light shielded region at the time of bonding with ultraviolet rays. Here, the region exposed to light at the time of bonding is masked with an ultraviolet shielding plate 6, whereby the resin composition in the region exposed to light is not cured when irradiation with ultraviolet rays is performed.

(Process 2)

Next, a liquid crystal display unit 1 and the transparent substrate 2 having a light shielding portion are bonded to each other in the form that the coating layer 7 of the liquid crystal display unit 1 and the surface provided with a light shielding portion 4 of the transparent substrate 2 having a light shielding portion face each other. The bonding can be performed in the air or in a vacuum.

(Process 3)

Next, the ultraviolet curable resin composition in the region exposed to light at the time of bonding is cured by irradiating the optical member obtained by bonding the transparent substrate 2 and the liquid crystal display unit 1 to each other with ultraviolet rays 9 from the side of the transparent substrate 2 having a light shielding portion.

In this manner, an optical member illustrated in FIG. 4 can be obtained.

Fourth Embodiment

The optical member of the invention can be produced according to the fourth embodiment modified as follows in addition to the first embodiment, the second embodiment, and the third embodiment.

(Process 1)

First, an ultraviolet curable resin composition is coated on each of the display surface of a liquid crystal display unit 1 and the surface provided with a light shielding portion 4 of a transparent substrate 2 having a light shielding portion. Thereafter, a coating layer 7 of the ultraviolet curable resin composition having a light shielded region at the time of bonding cured is obtained by irradiating the light shielded region at the time of bonding with ultraviolet rays. Here, the irradiation dose of ultraviolet rays is adjusted by containing acyl phosphine oxide in the ultraviolet curable resin composition, thereby obtaining the coating layers 7 of cured product layers having a cured part present on the lower side (the side of the liquid crystal display unit 1 or the transparent substrate 2 having a light shielding portion) of the coating layer 7 and an uncured part present on the upper side (the opposite side to the side of the liquid crystal display unit 1 or the transparent substrate 2 having a light shielding portion) of the coating layer 7. Meanwhile, the region exposed to light at the time of bonding is masked with an ultraviolet shielding plate 6, whereby the resin composition in the region exposed to light is not cured when irradiation with ultraviolet rays is performed.

(Process 2)

Next, a liquid crystal display unit 1 and the transparent substrate 2 having a light shielding portion are bonded to each other in the form that the coating layers 7 face each other. The bonding can be performed in the air or in a vacuum.

(Process 3)

Next, the ultraviolet curable resin composition in the region exposed to light at the time of bonding is cured by irradiating the optical member obtained by bonding the transparent substrate 2 and the liquid crystal display unit 1 to each other with ultraviolet rays 9 from the side of the transparent substrate 2 having a light shielding portion.

In this manner, an optical member illustrated in FIG. 4 can be obtained.

Each of the embodiments described above is an embodiment explaining several embodiments of the method of producing an optical member of the invention with reference to an exemplary specific optical substrate. Each of the embodiments is explained using a liquid crystal display unit and a transparent substrate having a light shielding portion. In the producing method of the invention, however, various kinds of members to be described below can be used as an optical substrate instead of the liquid crystal display unit, and various kinds of members to be described below can also be used as an optical substrate instead of the transparent substrate.

Not only that, as an optical substrate such as a liquid crystal display unit and a transparent substrate, an optical substrate, in which another optical substrate layer (for example, a film bonded using a cured product layer of an ultraviolet curable resin composition or another optical substrate layer) is further laminated to these various substrates, may be used.

Moreover, all of the coating method of ultraviolet curable resin composition, the film thickness of cured product of resin, the irradiation dose and light source at the time of ultraviolet rays irradiation, a technique to irradiate the light shielded region selectively with ultraviolet rays, and a process to increase adhesion by applying pressure to the optical member, which are described in the section of the first embodiment, are not only applied to the embodiments described above but can also be applied to any of the producing methods included in the invention.

Specific aspects of the optical member, including the liquid crystal display unit, capable of being produced by from the first embodiment to the fourth embodiment described above are represented below.

(i) An aspect in which an optical substrate having a light shielding potion is at least an optical substrate selected from the group consisting of a transparent glass substrate having a light shielding portion, a transparent resin substrate having a light shielding portion, and a glass substrate having a light shielding portion and a transparent electrode formed thereon, another optical substrate bonded thereto is at least a display body unit selected from the group consisting of a liquid crystal display unit, a plasma display unit, and an organic EL display unit, and the optical member to be obtained is the display body unit having an optical substrate having a light shielding portion.

(ii) An aspect in which one optical substrate is a protective substrate having a light shielding portion and the other optical substrate to be bonded thereto is a touch panel or a display body unit having a touch panel, and an optical member including at least two optical substrates bonded to each other is a touch panel having a protective substrate having a light shielding portion or a display body unit having the touch panel.

In this case, either one or both of the surface provided with a light shielding portion of the protective substrate having a light shielding portion and the touch surface of the touch panel are preferably coated with an ultraviolet curable resin composition in Process 1.

(iii) An aspect in which one optical substrate is an optical substrate having a light shielding portion and the other optical substrate to be bonded thereto is a display body unit, and an optical member including at least two optical substrates bonded to each other is a display body unit having an optical substrate having a light shielding portion.

In this case, either one or both of the surface of the side provided with a light shielding portion of the optical substrate having a light shielding portion and the display surface of the display body unit are preferably coated with an ultraviolet curable resin composition in Process 1.

Specific examples of the optical substrate having a light shielding portion may include a protective plate for display screen having a light shielding portion or a touch panel provided with a protective substrate having a light shielding portion.

The surface of the side provided with a light shielding portion of an optical substrate having a light shielding portion is, for example, the surface of the side provided with a light shielding portion of a protective plate in a case in which an optical substrate having a light shielding portion is a protective plate for display screen having a light shielding portion. In addition, the surface of the side provided with a light shielding portion of an optical substrate having a light shielding portion means the substrate surface of a touch panel opposite to the touch surface of the touch panel since the surface having a light shielding portion of a protective substrate having a light shielding portion is bonded to the touch surface of the touch panel in a case in which an optical substrate having a light shielding portion is a touch panel having a protective substrate having a light shielding portion.

The light shielding portion of an optical substrate having a light shielding portion may be at any position of the optical substrate, but is generally prepared in a frame shape on the periphery of an optical substrate of transparent platy shape or sheet shape. The width thereof is about from 0.5 to 10 mm, preferably about from 1 to 8 mm, and more preferably about from 2 to 8 mm.

Next, the ultraviolet curable resin composition of the invention will be described.

The ultraviolet curable resin composition used in the method of producing an optical member of the invention is not particularly limited as long as a resin is cured by irradiation with ultraviolet rays, but an ultraviolet curable resin composition (hereinafter, it is also referred to as "ultraviolet curable resin composition of the invention") containing (A) a (meth)acrylate and (B) a photopolymerization initiator is preferably used. The ultraviolet curable resin composition containing (A) a (meth)acrylate and (B) a photopolymerization initiator can contain other components capable of being added to an ultraviolet curable resin composition used for optics as an arbitrary component.

Meanwhile, the phrase "capable of being added to an ultraviolet curable resin composition used for optics" means that an additive deteriorating the transparency of cured product to an extent that the cured product cannot be used for optics is not contained.

A preferred average transmittance of a sheet is at least 90% at the light having a wavelength of from 400 to 800 nm when the sheet of cured product having a thickness of 200 μm after curing is prepared using the ultraviolet curable resin composition used in the invention.

The compositional proportion of the ultraviolet curable resin composition is that (A) the (meth)acrylate is from 25 to 90% by weight and (B) the photopolymerization initiator is from 0.2 to 5% by weight with respect to the total amount of the ultraviolet curable resin composition, and other components are the balance.

In the ultraviolet curable resin composition of the invention, any photopolymerization initiator generally used can be used as (B) the photopolymerization initiator.

(A) The (meth)acrylate in the ultraviolet curable resin composition of the invention is not particularly limited, but any one selected from the group consisting of a urethane (meth)acrylate, a (meth)acrylate having a polyisoprene backbone, and a (meth)acrylate monomer is preferably used. A more preferred aspect is that the ultraviolet curable resin composition of the invention contains both of (i) at least either a urethane (meth)acrylate or a (meth)acrylate having a polyisoprene backbone, and (ii) a (meth)acrylate monomer, as (A) the (meth)acrylate.

Meanwhile, the "(meth)acrylate" in the present specification means either one or both of methacrylate and acrylate. The same applies to "(meth)acrylic acid" or the like.

In addition, (ii) a (meth)acrylate monomer described above is used in the meaning of a (meth)acrylate other than (i) described above.

The urethane (meth)acrylate is obtained by reacting three of a polyhydric alcohol, a polyisocyanate, and a hydroxyl group-containing (meth)acrylate.

Examples of the polyhydric alcohol include an alkylene glycol having from 1 to 10 carbon atoms such as neopentyl glycol, 3-methyl-1,5-pentanediol, ethylene glycol, propylene glycol, 1,4-butanediol, and 1,6-hexanediol; a triol such as trimethylolpropane and pentaerythritol; an alcohol having a cyclic backbone such as tricyclodecanedimethylol and bis-[hydroxymethyl]-cyclohexane; and a polyester polyol obtained by the reaction of these polyhydric alcohols and a polybasic acid (for example, succinic acid, phthalic acid, hexahydrophthalic anhydride, terephthalic acid, adipic acid, azelaic acid, and tetrahydrophthalic anhydride); a caprolactone alcohol obtained by the reaction of a polyhydric alcohol and ε-caprolactone; a polycarbonate polyol (for example, a polycarbonate diol obtained by the reaction of 1,6-hexanediol and diphenyl carbonate); or a polyether polyol (for example, polyethylene glycol, polypropylene glycol, polytetramethylene glycol, and ethylene oxide modified bisphenol A).

Polypropylene glycol is preferable as the polyhydric alcohol from the viewpoint of the compatibility and adherence with other (A) components, and polypropylene glycol having a weight average molecular weight of 2000 or more is particularly preferable from the viewpoint of the adherence between the substrate and the cured product layer or the cured product layers. The adhesive force of the cured product layer is increased if polypropylene glycol having a weight average molecular weight of 2000 or more is used, and hence the effect that the separation at the interface between the coating layers 7 of the ultraviolet curable resin composition having a light shielded region cured at the time of bonding, which are adhered to each other, by external pressure or an environmental change is prevented is improved when optical substrates such as a liquid crystal display unit and a transparent substrate are bonded to one another. In addition, the adhesive force of the cured product layer of resin 8 with respect to the optical substrates of the liquid crystal display unit 1 or the transparent substrate 2 having a light shielding portion is also further increased. At this time, the upper limit of the weight average molecular weight of the polypropylene glycol is not particularly limited, but is preferably 10000 or less and more preferably 5000 or less.

Examples of an organic polyisocyanate include isophorone diisocyanate, hexamethylene diisocyanate, tolylene diisocyanate, xylene diisocyanate, diphenylmethane-4,4'-diisocyanate, or dicyclopentanyl isocyanate.

In addition, as the hydroxyl group-containing (meth)acrylate, for example, a hydroxyl C2-C4 alkyl (meth)acrylate such as hydroxyethyl (meth)acrylate, hydroxypropyl (meth)acrylate, and hydroxybutyl (meth)acrylate; dimethylolcyclohexyl mono(meth)acrylate; hydroxycaprolactone (meth)acrylate; and hydroxy-terminated polyalkylene glycol (meth)acrylate can be used.

The reaction to obtain the urethane (meth)acrylate is performed, for example, by the following manner. In other words, the polyhydric alcohol and the organic polyisocyanate is mixed such that an isocyanate group of the organic polyisocyanate per 1 equivalent hydroxyl group of the polyhydric alcohol is preferably from 1.1 to 2.0 equivalent and further preferably from 1.1 to 1.5 equivalent, and then the mixture is reacted at preferably from 70 to 90° C., thereby synthesizing a urethane oligomer. Subsequently, the urethane oligomer thus obtained and a hydroxy (meth)acrylate compound is mixed such that the hydroxyl group of the hydroxy (meth)acrylate compound per 1 equivalent isocyanate of the urethane oligomer is preferably from 1 to 1.5 equivalent, and then the mixture is reacted at from 70 to 90° C., thereby obtaining a urethane (meth)acrylate of the intended product.

The weight average molecular weight of the urethane (meth)acrylate is preferably about from 7000 to 25000 and more preferably from 10000 to 20000. Increase in shrinkage is concerned if the weight average molecular weight is too low, and deterioration in curability is concerned if the weight average molecular weight is too high.

With regard to the urethane (meth)acrylate in the ultraviolet curable resin composition of the invention, a kind of urethane (meth)acrylate can be used singly, or two or more kinds thereof can be mixed at an arbitrary proportion and used. The weight proportion of the urethane (meth)acrylate in the ultraviolet curable resin composition of the invention is generally from 20 to 80% by weight and preferably from 30 to 70% by weight.

The (meth)acrylate having a polyisoprene backbone is a compound having a (meth)acryloyl group at a terminal or a side chain of a polyisoprene molecule. The (meth)acrylate having a polyisoprene backbone can be available, for example, as "UC-203" (manufactured by KURARAY CO., LTD.). The number average molecular weight of the (meth)acrylate having a polyisoprene backbone is preferably from 10000 to 50000 and more preferably about from 25000 to 45000 in terms of polystyrene.

The weight proportion of the (meth)acrylate having a polyisoprene backbone in the ultraviolet curable resin composition of the invention is generally from 20 to 80% by weight and preferably from 30 to 70% by weight.

As the (meth)acrylate monomer, a (meth)acrylate having one (meth)acryloyl group in the molecule can be suitably used.

Here, a (meth)acrylate monomer indicates a (meth)acrylate other than the urethane (meth)acrylate, the epoxy (meth)acrylate to be described below, and the (meth)acrylate having a polyisoprene backbone.

Specific examples of the (meth)acrylate having one (meth)acryloyl group in the molecule may include an alkyl (meth)acrylate having from 5 to 20 carbon atoms such as isooctyl (meth)acrylate, isoamyl (meth)acrylate, lauryl (meth)acrylate, isodecyl (meth)acrylate, stearyl (meth)acrylate, cetyl (meth)acrylate, isomyristyl (meth)acrylate, and tridecyl (meth)acrylate; a (meth)acrylate having a cyclic backbone and preferably a cyclic backbone having from 4 to 10 carbon atoms such as benzyl (meth)acrylate, tetrahydrofurfuryl (meth)acrylate, acryloylmorpholine, phenyl glycidyl (meth)acrylate, tricyclodecane (meth)acrylate, dicyclopentenyl acrylate, dicyclopentenyloxyethyl (meth)acrylate, isobornyl (meth)acrylate, dicyclopentanyl (meth)acrylate, 1-adamantyl acrylate, 2-methyl-2-adamantyl acrylate, 2-ethyl-2-adamantyl acrylate, 1-adamantyl methacrylate, polypropylene oxide modified nonylphenyl (meth)acrylate, and dicyclopentadieneoxyethyl (meth)acrylate; an alkyl (meth)acrylate having from 1 to 5 carbon atoms, which has a hydroxyl group such as 2-hydroxypropyl (meth)acrylate and 4-hydroxybutyl (meth)acrylate; a polyalkylene glycol (meth)acrylate such as ethoxydiethylene glycol (meth)acrylate, polypropylene glycol (meth)acrylate, and polypropylene oxide modified nonylphenyl (meth)acrylate; and a phosphoric acid (meth)acrylate such as ethylene oxide modified phenoxylated phosphoric acid (meth)acrylate, ethylene oxide modified butoxylated phosphoric acid (meth)acrylate, and ethylene oxide modified octyloxylated phosphoric acid (meth)acrylate and preferably ethylene oxide modified-alkoxylated or phenoxylated phosphoric acid (meth)acrylate having from 4 to 10 carbon atoms.

As the (meth)acrylate having one (meth)acryloyl group in the molecule, among them, a compound selected from a group consisting of an alkyl (meth)acrylate having from 10 to 20 carbon atoms, 2-ethylhexyl carbitol acrylate, acryloylmorpholine, 4-hydroxybutyl (meth)acrylate, tetrahydrofurfuryl (meth)acrylate, isostearyl (meth)acrylate, dicyclopentenyloxyethyl (meth)acrylate, and polypropylene oxide modified nonylphenyl (meth)acrylate is preferably used. Particularly, a compound selected from the group consisting of an alkyl (meth)acrylate having from 10 to 20 carbon atoms, dicyclopentenyloxyethyl (meth)acrylate, polypropylene oxide modified nonylphenyl (meth)acrylate, and tetrahydrofurfuryl (meth)acrylate is preferably used, an alkyl (meth)acrylate having from 10 to 20 carbon atoms is more preferably used, and lauryl (meth)acrylate is further preferably used from the viewpoint of flexibility of resin.

Meanwhile, as the (meth)acrylate monomer, at least one of an alkyl (meth)acrylate having from 1 to 5 carbon atoms, which has a hydroxyl group, and acryloylmorpholine is preferably used, and acryloylmorpholine is particularly preferably used from the viewpoint of improvement in adherence to glass.

As the (meth)acrylate monomer, both of an alkyl (meth)acrylate having from 10 to 20 carbon atoms and an alkyl (meth)acrylate having from 1 to 5 carbon atoms, which has a hydroxyl group, or acryloylmorpholine are preferably contained, and both of lauryl (meth)acrylate and acryloylmorpholine are preferably contained.

The composition of the invention can contain a multifunctional (meth)acrylate monomer other than the (meth)acrylate having one (meth)acryloyl group in the range that the characteristics of the invention are not impaired.

Examples of the multifunctional (meth)acrylate monomer may include a bifunctional (meth)acrylate such as tricyclodecanedimethylol di(meth)acrylate, dioxane glycol di(meth)acrylate, polypropylene glycol di(meth)acrylate, polytetramethylene glycol di(meth)acrylate, alkylene oxide modified bisphenol A type di(meth)acrylate, caprolactone modified hydroxypivalic acid neopentyl glycol di(meth)acrylate, and ethylene oxide modified phosphoric acid di(meth)acrylate; a trifunctional (meth)acrylate such as a trimethylol C2-C10 alkane tri(meth)acrylate such as trimethylolpropane tri(meth)acrylate, and trimethyloloctane tri(meth)acrylate, trimethylol C2-C10 alkane polyalkoxy tri(meth)acrylate such as trimethylolpropane polyethoxy tri(meth)acrylate, trimethylolpropane polypropoxy tri(meth)acrylate, and trimethylolpropane polyethoxy polypropoxy tri(meth)acrylate, tris[(meth)acryloyloxyethyl]isocyanurate, pentaerythritol tri(meth)acrylate, and alkylene oxide modified trimethylolpropane tri(meth)acrylate such as ethylene oxide modified trimethylolpropane tri(meth)acrylate and propylene oxide modified trimethylolpropane tri(meth)acrylate; and a tetrafunctional or more (meth)acrylate such as pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, and dipentaerythritol hexa(meth)acrylate.

In the invention, a bifunctional (meth)acrylate is preferably used in order to suppress cure shrinkage in a case in which the polyfunctional (meth)acrylate described above is concurrently used.

With regard to these (meth)acrylate monomers in the ultraviolet curable resin composition of the invention, a kind of (meth)acrylate monomer can be used singly, or two or more kinds thereof can be mixed at an arbitrary proportion and used. The weight proportion of the (meth)acrylate monomer in the ultraviolet curable resin composition of the invention is generally from 5 to 70% by weight and preferably from 10 to 50% by weight. Deterioration in curability is concerned if the weight proportion is less than 5% by weight, and increase in shrinkage is concerned if the weight proportion is more than 70% by weight.

In the aspect, in which the ultraviolet curable resin composition of the invention contains both of (i) at least either a urethane (meth)acrylate or a (meth)acrylate having a polyisoprene backbone, and (ii) a (meth)acrylate monomer, the total content of both (i) and (ii) is generally from 25 to 90% by weight, preferably from 40 to 90% by weight, and more preferably from 40 to 80% by weight with respect to the total amount of the resin composition.

In the invention, a (meth)acrylate having a polypropylene oxide structure is particularly preferably used as (A) the (meth)acrylate from the viewpoint of excellence in stickiness after curing in the coating layer of ultraviolet curable resin composition, which is obtained through Process 1 and of which the light shielded region is selectively cured and the other part other than the light shielded region is uncured, and imparting strong adhesive force in the interface at the time of bonding as well. The adhesive force of the cured product layer is improved if a (meth)acrylate having a polypropylene oxide structure is used, and hence the effect that the separation at the interface between the coating layers 7 of the ultraviolet curable resin composition having a light shielded region cured at the time of bonding, which are adhered to each other, by external pressure or an environmental change is prevented is improved when optical substrates such as a liquid crystal display unit and a transparent substrate are bonded to one another. In addition, the adhesive force of the cured product layer of resin 8 with respect to the liquid crystal display unit 1 or the transparent substrate 2 having a light shielding portion is also further increased.

As the (meth)acrylate having a polypropylene oxide structure among (A) the (meth)acrylates, a urethane (meth)acrylate having a polypropylene oxide structure and a (meth)acrylate monomer having a polypropylene oxide structure and exemplified.

In the ultraviolet curable resin composition of the invention, it is more preferable that a urethane (meth)acrylate having a polypropylene oxide structure be contained as (A) the (meth)acrylate.

Specific examples of the urethane (meth)acrylate having a polypropylene oxide structure include a urethane (meth)acrylate obtained by reacting three of a polypropylene glycol, a polyisocyanate, and a hydroxyl group-containing (meth)acrylate.

Specific examples of the (meth)acrylate monomer having a polypropylene oxide structure include polypropylene glycol (meth)acrylate, polypropylene oxide modified nonylphenyl (meth)acrylate, polypropylene glycol di(meth)acrylate, and propylene oxide modified trimethylolpropane tri(meth)acrylate.

In the ultraviolet curable resin composition of the invention, an epoxy (meth)acrylate can be used as (A) the (meth)acrylate in a range that the characteristics of the invention are not impaired.

An epoxy (meth)acrylate has a function that increases curability, hardness of cured product, or cure rate. As the epoxy (meth)acrylate, any epoxy (meth)acrylate obtained by reacting a glycidyl ether type epoxy compound with (meth)acrylic acid can be used.

As the glycidyl ether type epoxy compound in order to obtain an epoxy (meth)acrylate to be preferably used, a diglycidyl ether of bisphenol A or an alkylene oxide adduct thereof, a diglycidyl ether of bisphenol F or an alkylene oxide adduct thereof, a diglycidyl ether of hydrogenated bisphenol A or an alkylene oxide adduct thereof, a diglycidyl ether of hydrogenated bisphenol F or an alkylene oxide adduct thereof, ethylene glycol diglycidyl ether, propylene glycol diglycidyl ether, neopentyl glycol diglycidyl ether, butanediol diglycidyl ether, hexanediol diglycidyl ether, cyclohexanedimethanol diglycidyl ether, polypropylene glycol diglycidyl ether, and the like can be exemplified.

An epoxy (meth)acrylate is obtained by reacting these glycidyl ether type epoxy compounds with (meth)acrylic acid under the following conditions.

The glycidyl ether type epoxy compound and (meth)acrylic acid are reacted at a ratio of from 0.9 to 1.5 mole, and more preferably from 0.95 to 1.1 mole of (meth)acrylic acid per 1 equivalent epoxy group of the glycidyl ether type epoxy compound. The reaction temperature is preferably from 80 to 120° C., and the reaction time is about from 10 to 35 hours. In order to promote the reaction, for example, a catalyst such as triphenylphosphine, TAP, triethanolamine, and tetraethyl ammonium chloride is preferably used. In addition, for example, p-methoxyphenol and methylhydroquinone can also be used as a polymerization inhibitor in order to prevent polymerization during reaction.

As the epoxy (meth)acrylate suitably usable in the invention, a bisphenol A type epoxy (meth)acrylate obtained from a bisphenol A type epoxy compound is exemplified. The weight average molecular weight of the epoxy (meth)acrylate suitably usable in the invention is preferably from 500 to 10000.

The weight proportion of the epoxy (meth)acrylate in the ultraviolet curable resin composition of the invention is generally from 1 to 80% by weight and preferably from 5 to 30% by weight.

The content proportion of (A) the (meth)acrylate in the ultraviolet curable resin composition of the invention is from 25 to 90% by weight, preferably from 40 to 90% by weight, and more preferably from 40 to 80% by weight with respect to the total amount of the ultraviolet curable resin composition.

In the ultraviolet curable resin composition of the invention, it is preferable to contain at least one selected from the group consisting of the urethane (meth)acrylate, the (meth)acrylate having a polyisoprene backbone, and the (meth)acrylate monomer as (A) the (meth)acrylate; it is more preferable that the content proportion of the urethane (meth)acrylate be from 20 to 80% by weight and preferably from 30 to 70% by weight, the content proportion of the (meth)acrylate having a polyisoprene backbone be from 20 to 80% by weight and preferably from 30 to 70% by weight, and the content proportion of the (meth)acrylate monomer be from 5 to 70% by weight and preferably from 10 to 50% by weight.

In the ultraviolet curable resin composition of the invention, it is further preferable that either the urethane (meth)acrylate or the (meth)acrylate having a polyisoprene backbone be contained as (A) the (meth)acrylate and the content proportion thereof be from 20 to 80% by weight and preferably from 30 to 70% by weight, and the (meth)acrylate monomer be contained as (A) the (meth)acrylate and the content proportion thereof be from 5 to 70% by weight and preferably from 10 to 50% by weight.

As (B) the photopolymerization initiator contained in the ultraviolet curable resin composition of the invention, any publicly known photopolymerization initiator can be used.

Specific examples of (B) the photopolymerization initiator may include 1-hydroxycyclohexyl phenyl ketone (Irgacure (trade name, the same applies hereinafter) 184; manufactured by BASF), 2-hydroxy-2-methyl-[4-(1-methylvinyl)phenyl] propanol oligomer (Esacure ONE; manufactured by Lamberti S. p. A.), 1-[4-(2-hydroxyethoxy)-phenyl]-2-hydroxy-2-methyl-1-propane-1-one (Irgacure 2959; manufactured by BASF), 2-hydroxy-1-{4-[4-(2-hydroxy-2-methyl-propionyl)-benzyl]-phenyl}-2-methyl-propan-1-one (Irgacure 127; manufactured by BASF), 2,2-dimethoxy-2-phenyl acetophenone (Irgacure 651; manufactured by BASF), 2-hydroxy-2-methyl-1-phenyl-propan-1-one (Darocur (trade name) 1173; manufactured by BASF), 2-methyl-1-[4-(methylthio)phenyl]-2-morpholino-1-one (Irgacure 907; manufactured by BASF), a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester (Irgacure 754; manufactured by BASF), 2-benzyl-2-dimethylamino-1-(4-morpholinophenyl)-butane-1-one, 2-chlorothioxanthone, 2,4-dimethylthioxanthone, 2,4-diisopropylthioxanthone, isopropylthioxanthone, 2,4,6-trimethyl benzoyl diphenyl phosphine oxide, 2,4,6-trimethyl benzoyl phenyl ethoxy phosphine oxide, bis(2,4,6-trimethyl benzoyl)-phenyl phosphine oxide, and bis(2,6-dimethoxybenzoyl)-2,4,4-trimethyl-pentyl phosphine oxide.

Here, an acyl phosphine oxide compound such as 2,4,6-trimethyl benzoyl diphenyl phosphine oxide is preferably used in order to obtain a cured product layer having a cured part present on the optical substrate side and an uncured part present on the opposite side to the optical substrate side when the light shielded region of the ultraviolet curable resin composition after coating is selectively irradiated with ultraviolet rays. Among them, as (B) the photopolymerization initiator, 2,4,6-trimethyl benzoyl diphenyl phosphine oxide is particularly preferable from the viewpoint of easy formation of the uncured part and the transparency of the cured product layer of resin. The irradiation dose of ultraviolet rays in Process 1 is preferably from 5 to 200 mJ/cm$^2$ and particularly preferably from 10 to 100 mJ/cm$^2$ in a case in which a cured product layer having a cured part present on the optical substrate side and an uncured part present on the opposite side to the optical substrate side is obtained in the coating layer 7 of the ultraviolet curable resin composition having a light shielded region cured at the time of bonding.

In the ultraviolet curable resin composition of the invention, a kind of these (B) photopolymerization initiators can be used singly, or two or more kinds thereof can be mixed at an arbitrary proportion and used. The weight proportion of (B) the photopolymerization initiator in the ultraviolet curable resin composition of the invention is generally from 0.2 to 5% by weight and preferably from 0.3 to 3% by weight. The transparency and curability of the ultraviolet curable resin composition are favorable if the weight proportion thereof is in this range. However, deterioration in the transparency of cured product layer of resin is concerned if (B) the photopolymerization initiator is too much. In addition, the cure extent of the resin composition becomes insufficient if (B) the photopolymerization initiator is too little.

The ultraviolet curable resin composition of the invention can contain a photopolymerization initiation auxiliary to be described below, a compound having a structure represented by Formula (1) to be described below, a softening component to be described below, and the additives to be described below as other components other than (A) the (meth)acrylate described above and (B) the photopolymerization initiator described above. The content proportion of other components with respect to the total amount of the ultraviolet curable resin composition of the invention is the balance obtained by subtracting the total amount of (A) the (meth)acrylate and (B) the photopolymerization initiator from the total amount of the ultraviolet curable resin composition. Specifically, the total amount of other components is from 0 to 74.8% by weight and preferably about from 5 to 70% by weight with respect to the total amount of the ultraviolet curable resin composition of the invention.

In the ultraviolet curable resin composition of the invention, an amine capable of being a photopolymerization initiation auxiliary can also be concurrently used with (B) the photopolymerization initiator as one of other components. Examples of the usable amine include benzoic acid 2-dimethylaminoethyl ester, dimethylaminoacetophenone, p-dimethylaminobenzoic acid ethyl ester, or p-dimethylaminobenzoic acid isoamyl ester. In a case in which a photopolymerization initiation auxiliary such as the amine is used, the content thereof in the ultraviolet curable resin composition of the invention is generally from 0.005 to 5% by weight and preferably from 0.01 to 3% by weight.

A compound having a structure represented by Formula (1) can be contained in the ultraviolet curable resin composition of the invention if necessary.

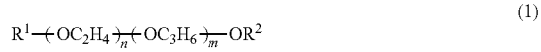   (1)

(In Formula (1), n represents an integer from 0 to 40, and m represents an integer from 10 to 50. $R^1$ and $R^2$ may be the same or different from each other. $R^1$ and $R^2$ are an alkyl group having from 1 to 18 carbon atoms, an alkenyl group having from 1 to 18 carbon atoms, an alkynyl group having from 1 to 18 carbon atoms, and an aryl group having from 5 to 18 carbon atoms.)

The compound having a structure represented by Formula (1) can be available, for example, as UNISAFE PKA-5017 manufactured by NOF CORPORATION (trade name, polyethylene glycol-polypropylene glycol allylbutyl ether).

The weight proportion of the compound having a structure represented by Formula (1) in the ultraviolet curable resin composition of the invention is generally from 10 to 80% by weight and preferably from 10 to 70% by weight when the compound having a structure represented by Formula (1) is used.

In the ultraviolet curable resin composition of the invention, a softening component other than those described above can be used if necessary. A publicly known softening component and plasticizer generally used in an ultraviolet curable resin can be used as the softening component other than those described above in the invention. Specific examples of the usable softening component include a polymer or oligomer other than the (meth)acrylate or the compound having a structure represented by Formula (1), an ester of phthalic acid, an ester of phosphoric acid, a glycol ester, an ester of citric acid, an ester of aliphatic dibasic acid, an ester of fatty acid, an epoxy plasticizer, castor oils, and a hydrogenated terpene resin. Examples of the polymer or oligomer may include a polymer or oligomer having a polyisoprene backbone, a polymer or oligomer having a polybutadiene backbone, or a polymer or oligomer having a xylene backbone, and any ester thereof. A polymer or oligomer having a polybutadiene backbone and any ester thereof is preferably used depending on the case. Specific examples of the polymer or oligomer having a polybutadiene backbone and an ester thereof include butadiene homopolymer, epoxy modified polybutadiene, butadiene-styrene random copolymer, maleic acid modified polybutadiene, and terminal hydroxyl group modified liquid polybutadiene.

The weight proportion of the softening component in the ultraviolet curable resin composition is generally from 10 to 80% by weight and preferably from 10 to 70% by weight in a case in which the softening component is used.

In the ultraviolet curable resin composition of the invention, an additive such as an antioxidant, an organic solvent, a coupling agent, a polymerization inhibitor, a leveling agent, an antistatic agent, a surface lubricant, a fluorescent whitening agent, a light stabilizer (for example, a hindered amine compound, or the like), or a filler may be added if necessary.

Specific examples of the antioxidant include BHT, 2,4-bis-(n-octylthio)-6-(4-hydroxy-3,5-di-t-butylanilino)-1,3,5-triazine, pentaerythrityl.tetrakis[3-(3,5-di-t-butyl-4-hydroxyphenyl)propionate], 2,2-thio-diethylene bis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3-t-butyl-5-methyl-4-hydroxyphenyl) propionate], octadecyl-3-(3,5-di-t-butyl-4-hydroxyphenyl) propionate, N,N-hexamethylene bis(3,5-di-t-butyl-4-hydroxy-hydrocinnamamide), 1,3,5-trimethyl-2,4,6-tris(3,5-di-t-butyl-4-hydroxybenzyl)benzene, tris-(3,5-di-t-butyl-4-hydroxybenzyl)-isocyanurate, octyl diphenylamine, 2,4-bis [(octylthio)methyl-O-cresol, isooctyl-3-(3,5-di-t-butyl-4-hydroxyphenyl)propionate], and dibutylhydroxytoluene.

Specific examples of the organic solvent include an alcohol such as methanol, ethanol, and isopropyl alcohol, dimethyl sulfone, dimethyl sulfoxide, tetrahydrofuran, dioxane, toluene, and xylene.

Examples of the coupling agent include a silane coupling agent, a titanium-based coupling agent, a zirconium-based coupling agent, and an aluminum-based coupling agent.

Specific examples of the silane coupling agent include 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-(2-aminoethyl)3-aminopropylmethyldimethoxysilane, γ-mercaptopropyltrimethoxysilane, N-(2-aminoethyl)3-aminopropylmethyltrimethoxysilane, 3-aminopropyltriethoxysilane, 3-mercaptopropyltrimethoxysilane, vinyltrimethoxysilane, N-(2-(vinylbenzylamino)ethyl)3-aminopropyltrimethoxysilane hydrochloride, 3-methacryloxypropyltrimethoxysilane, 3-chloropropylmethyldimethoxysilane, and 3-chloropropyltrimethoxysilane.

Specific examples of the titanium-based coupling agent include isopropyl(N-ethylamino-ethylamino)titanate, isopropyl triisostearoyl titanate, titanium di(dioctyl pyrophosphate)oxyacetate, tetraisopropyl di(dioctyl phosphite)titanate, and neoalkoxy tri(p-N-(β-aminoethyl)aminophenyl) titanate.

Specific examples of the zirconium-based coupling agent and the aluminum-based coupling agent include Zr-acetylacetonate, Zr-methacrylate, Zr-propionate, neoalkoxy zirconate, neoalkoxy tris(neodecanoyl) zirconate, neoalkoxy tris(dodecanoyl)benzenesulfonyl zirconate, neoalkoxy tris(ethylene amino ethyl)zirconate, neoalkoxy tris(m-aminophenyl)zirconate, ammonium zirconium carbonate, Al-acetylacetonate, Al-methacrylate, and Al-propionate.

Specific examples of the polymerization inhibitor include p-methoxyphenol and methylhydroquinone.

Specific examples of the light stabilizer include 1,2,2,6,6-pentamethyl-4-piperidyl alcohol, 2,2,6,6-tetramethyl-4-piperidyl alcohol, 1,2,2,6,6-pentamethyl-4-piperidyl (meth) acrylate (Product name: LA-82 manufactured by ADEKA CORPORATION), tetrakis(1,2,2,6,6-pentamethyl-4-piperidyl)-1,2,3,4-butane tetracarboxylate, tetrakis(2,2,6,6-tetramethyl-4-piperidyl)-1,2,3,4-butane tetracarboxylate, a mixed ester product of 1,2,3,4-butane tetracarboxylic acid, 1,2,2,6,6-pentamethyl-4-piperidinol, and 3,9-bis(2-hydroxy-1,1-dimethylethyl)-2,4,8,10-tetraoxaspiro[5.5]undecane, decanedioic acid bis(2,2,6,6-tetramethyl-4-piperidyl)sebacate, bis(1-undecane-2,2,6,6-tetramethylpiperidin-4-yl)carbonate, 2,2,6,6-tetramethyl-4-piperidyl methacrylate, bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl-(meth)acrylate, bis(1,2,2,6,6-pentamethyl-4-piperidinyl)[[3, 5-bis(1,1-dimethylethyl)-4-hydroxyphenyl]methyl]butyl malonate, decanedioic acid bis(2,2,6,6-tetramethyl-1(octyloxy)-4-piperidinyl)ester, a reaction product of 1,1-dimethylethyl hydroperoxide and octane, N,N',N'',N'''-tetrakis-(4,6-bis-(butyl-(N-methyl-2,2,6,6-tetramethylpiperidin-4-yl) amino)-triazine-2-yl)-4,7-diazadecane-1,10-diamine, a polycondensate of dibutylamine.1,3,5-triazine.N,N'-bis(2,2, 6,6-tetramethyl-4-piperidyl-1,6-hexamethylenediamine and N-(2,2,6,6-tetramethyl-4-piperidyl)butylamine, poly[[6-(1, 1,3,3-tetramethylbutyl)amino-1,3,5-triazine-2,4-diyl][(2,2, 6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidineethanol, 2,2,4,4-tetramethyl-20-(β-lauryloxycarbonyl)ethyl-7-oxa-3,20-diazadispiro[5.1.11.2]heneicosane-21-one, β-alanine, N,-(2,2,6,6-tetramethyl-4-piperidinyl)-dodecyl ester/tetradecyl ester, N-acetyl-3-dodecyl-1-(2,2,6, 6-tetramethyl-4-piperidinyl)pyrrolidine-2,5-dione, 2,2,4,4-tetramethyl-7-oxa-3,20-diazadispiro[5,1,11,2]heneicosane-21-one, 2,2,4,4-tetramethyl-21-oxa-3,20-diazadicyclo-[5,1, 11,2]-heneicosane-20-propanoic acid dodecyl ester/tetradecyl ester, propanedioic acid, [(4-methoxyphenyl)-methylene]-bis(1,2,2,6,6-pentamethyl-4-piperidinyl) ester, a higher fatty acid ester of 2,2,6,6-tetramethyl-4-piperidinol, a hindered amine-based compound such as 1,3-benzenedicarboxamide and N,N'-bis(2,2,6,6-tetramethyl-4-piperidinyl), a benzophenone-based compound such as octabenzone, 2-(2H-benzotriazol-2-yl)-4-(1,1,3,3-tetramethyl-butyl)phenol, 2-(2-hydroxy-5-methylphenyl)benzotriazole, 2-[2-hydroxy-3-(3,4,5,6-tetrahydrophthalimide-methyl)-5-methyl-phenyl] benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazol-2-yl)-5-tert-butyl-4-hydroxyphenyl) propionate and polyethylene glycol, a benzotriazole-based compound such as 2-(2H-benzotriazol-2-yl)-6-dodecyl-4-methylphenol, a benzoate-based compound such as 2,4-di-tert-butylphenyl-3,5-di-tert-butyl-4-hydroxybenzoate, and a triazine-based compound such as 2-(4,6-diphenyl-1,3,5-triazin-2-yl)-5-[(hexyl)oxy]phenol. A particularly preferred light stabilizer is a hindered amine-based compound.

Specific examples of the filler include a powder such as crystalline silica, fused silica, alumina, zircon, calcium silicate, calcium carbonate, silicon carbide, silicon nitride, boron nitride, zirconia, stellite, steatite, spinel, titania, and talc, or a bead obtained by the spheroidizing of these.

The content proportion of the additive added if necessary with respect to the total amount of the ultraviolet curable resin composition is about from 0 to 3% by weight in total of the additives described above. The content proportion of various kinds of additives is from 0.01 to 3% by weight, preferably from 0.01 to 1% by weight, and more preferably from 0.02 to 0.5% by weight with respect to the total amount of the composition in a case in which the additives are used.

The ultraviolet curable resin composition of the invention can be obtained by mixing and dissolving (A) the (meth) acrylate, (B) the photopolymerization initiator, and, if necessary, other components described above at from room temperature to 80° C. In addition, impurities may be removed by an operation such as filtration if necessary.

It is preferable to adjust the blending ratio of the components appropriately with regard to the composition for adhesion of the ultraviolet curable resin composition of the invention such that the viscosity thereof is in a range of from 300 to 15000 mPa·s at 25° C. in consideration of the coating properties thereof.

The cure shrinkage of the cured product of the ultraviolet curable resin composition of the invention is preferably 3.0% or less, and particularly preferably 2.0% or less. By virtue of this, the internal stress accumulated on the cured product of resin can be reduced, and thus occurring of distortion at the interface between the substrate and the cured product layer of the ultraviolet curable resin composition can be effectively prevented when the ultraviolet curable resin composition is cured.

In addition, if the cure shrinkage is great, the display performance is significantly adversely affected from the time when a warp at the time of curing increases in a case in which the substrate such as glass is thin. The cure shrinkage is preferably small in extent from the viewpoint of this description as well.

The cured product of the ultraviolet curable resin composition of the invention preferably has a transmittance of 90% or more in a wavelength region of from 400 to 800 nm when the cured product is formed into a film having a thickness of 200 μm. It is because that it is difficult for light to pass through the cured product in a case in which the transmittance is less than 90%, and thus decrease in visibility of the display image is concerned in a case in which the cured product is used in a display device.

In addition, improvement in visibility of the display image is further expected if the transmittance in a wavelength region of from 400 to 450 nm is high. For this reason, the transmittance in a wavelength region of from 400 to 450 nm is preferably 90% or more when the cured product is formed into a film having a thickness of 200 μm.

Several preferred aspects with regard to an ultraviolet curable resin composition containing (A) a (meth)acrylate and (B) a photopolymerization initiator, which is used in the producing method of the invention, are described below. The "% by weight" in the content of respective components denotes the content proportion with respect to the total amount of the ultraviolet curable resin composition of the invention.

(I)

The ultraviolet curable resin composition containing (A) a (meth)acrylate and (B) a photopolymerization initiator, in which (A) the (meth)acrylate is at least one (meth)acrylate selected from the group consisting of a urethane (meth)acrylate, a (meth)acrylate having a polyisoprene backbone, and a (meth)acrylate monomer.

(II)

The ultraviolet curable resin composition according to (I) described above, which contains both of (i) a urethane (meth) acrylate or a (meth)acrylate having a polyisoprene backbone, and (ii) a (meth)acrylate monomer as (A) the (meth)acrylate.

(III)

The ultraviolet curable resin composition according to (I) or (II) described above, in which the urethane (meth)acrylate or the (meth)acrylate monomer is a urethane (meth)acrylate having a polypropylene oxide structure or a (meth)acrylate monomer having a polypropylene oxide structure.

(IV)

The ultraviolet curable resin composition according to (I) or (II) described above, in which the urethane (meth)acrylate is a urethane (meth)acrylate obtained by reacting three of a polypropylene glycol, a polyisocyanate, and a hydroxyl group-containing (meth)acrylate.

(V)

The ultraviolet curable resin composition according to any one of (I) to (IV) described above, in which the weight average molecular weight of the urethane (meth)acrylate is from 7000 to 25000, and the number average molecular weight of the (meth)acrylate having a polyisoprene backbone is from 15000 to 50000.

(VI)

An ultraviolet curable resin composition containing (A) a (meth)acrylate and (B) a photopolymerization initiator, in which 2,4,6-trimethyl benzoyl diphenyl phosphine oxide is contained as (B) the photopolymerization initiator, or the ultraviolet curable resin composition according to any one of (I) to (V) described above, in which 2,4,6-trimethyl benzoyl diphenyl phosphine oxide is contained as (B) the photopolymerization initiator.

(VII)

An ultraviolet curable resin composition containing (A) a (meth)acrylate and (B) a photopolymerization initiator, which further contains other components other than (A) component and (B) component, or the ultraviolet curable resin composition according to any one of (I) to (VI) described above, which further contains other components other than (A) component and (B) component.

(VIII)

The ultraviolet curable resin composition according to (VII) described above, in which the content proportion of (A) a (meth)acrylate is from 25 to 90% by weight and the content proportion of (B) a photopolymerization initiator is from 0.2 to 5% by weight, and other components are the balance.

(IX)

The ultraviolet curable resin composition according to (VIII) described above, which contains (i) at least either a urethane (meth)acrylate or a polyisoprene (meth)acrylate at from 20 to 80% by weight, and (ii) a (meth)acrylate monomer at from 5 to 70% by weight as (A) the (meth)acrylate, and in which the sum of the two is from 40 to 90% by weight.

(X)

The ultraviolet curable resin composition according to any one of (VII) to (IX) described above, which contains a compound represented by Formula (1) at from 10 to 80% by weight as other components.

(XI)

An ultraviolet curable resin composition containing (A) a (meth)acrylate and (B) a photopolymerization initiator or the ultraviolet curable resin composition according to any one of (I) to (X) described above, in which the cure shrinkage of the cured product of the ultraviolet curable resin composition is 3% or less.

(XII)

An ultraviolet curable resin composition containing (A) a (meth)acrylate and (B) a photopolymerization initiator or the ultraviolet curable resin composition according to any one of (I) to (XI) described above, in which the transmittance of a sheet which is a cured product of ultraviolet curable resin composition and has a film thickness of 200 µm is that the average transmittance in a wavelength region of from 400 to 450 nm is at least 90%, and the average transmittance in a wavelength region of from 400 to 800 nm is at least 90%.

The ultraviolet curable resin composition of the invention can be suitably used as an adhesive to produce an optical member by bonding plural optical substrates to one another through a procedure including Process 1 to Process 3 and an arbitrary process 4.

As the optical substrate used in the method of producing an optical member of the invention, a transparent plate, a sheet, a touch panel, a display body unit, and the like can be exemplified.

The "optical substrate" in the present specification means both of an optical substrate, which does not have a light shielding portion on the surface, and an optical substrate, which has a light shielding portion on the surface. At least one of the plural optical substrates used is an optical substrate having a light shielding portion in the method of producing an optical member of the invention.

The position of the shielding portion in the optical substrate having a light shielding portion is not particularly limited. As a preferred aspect, a case, in which a belt-shaped light shielding portion having a width of from 0.05 to 20 mm, preferably about from 0.05 to 10 mm, more preferably about from 0.1 to 6 mm is formed on the periphery of the optical substrate, is exemplified. The light shielding portion on an optical substrate can be formed by gluing tape, coating a coating, printing, or the like.

In addition, in the method of producing an optical member of the invention, an optical substrate to be bonded to an optical substrate having a light shielding portion may be an optical substrate having a light shielding portion on the surface thereof or an optical substrate not having a light shielding portion.

As the material of the optical substrate used in the invention, diverse materials can be used. Specific examples thereof include PET, PC, PMMA, a composite of PC and PMMA, glass, COC, COP, and a resin such as acrylic resin. As the optical substrate used in the invention, for example a transparent plate or a sheet, a sheet or transparent plate laminated with plural films such as a polarizing plate or sheets; a sheet or transparent plate not laminated; a transparent plate (an inorganic glass plate and processed goods thereof, for example, a lense, a prism, ITO glass) produced from an inorganic glass; and the like can be used.

In addition, the optical substrate used in the invention includes a laminated body (hereinafter, it is also referred to as "functional laminated body") formed of a plurality of functional plates or sheets such as a touch panel (a touch panel input sensor) or a display body unit to be described below in addition to the polarizing plate and the like described above.

Examples of the sheet usable as the optical substrate used in the invention includes an icon sheet, a decorative sheet, and a protective sheet. Examples of the plate (transparent plate) usable in the method of producing an optical member of the invention include a decorative plate and a protective plate. As the material of these sheets and plates, the materials exemplified as the materials of the transparent plates and sheets above can be adopted.

Examples of the material for the surface of the touch panel usable as the optical substrate used in the invention include glass, PET, PC, PMMA, a composite of PC and PMMA, COC, and COP.

The thickness of the optical substrate of a platy shape or sheet shape such as a transparent plate or a sheet is not particularly limited, and the thickness is generally from about 5 µm to about 5 cm, preferably from about 10 µm to about 10 mm, and more preferably about from 50 µm to 3 mm.

As a preferred optical member obtainable by the producing method of the invention, an optical member, in which a transparent optical substrate, which has a light shielding portion and is in a platy shape or sheet shape, and the functional laminated body described above are bonded to each other using the cured product of the ultraviolet curable resin composition of the invention, can be exemplified.

In addition, in the producing method of the invention, a display body unit with optical functional material (hereinafter, it is also referred to as "display panel") can be produced by using a display body unit such as a liquid crystal display device as an optical substrate and an optical functional material as another optical substrate. Examples of the display body unit include a display device such as an LCD having a polarizing plate bonded to glass, an organic or inorganic EL display, EL lighting, electronic paper, and a plasma display. In addition, examples of the optical functional material include a transparent plastic plate such as an acrylic plate, a PC plate, a PET plate, and a PEN plate, tempered glass, and a touch panel input sensor.

The refractive index of the cured product is more preferably from 1.45 to 1.55 since the visibility of display image is more improved in a case in which the ultraviolet curable resin composition of the invention is used as an adhesive for bonding optical substrates to one another.

If the refractive index of the cured product is in the range, difference in refractive index with a substrate used as an optical substrate can be reduced, diffused reflection of light can be suppressed, and thus optical loss can be reduced.

As preferred aspects of the optical member obtainable by the producing method of the invention, the following (i) to (vii) can be exemplified.

(i) An optical member obtained by bonding an optical substrate having a light shielding portion and the functional laminated body to each other using the cured product of the ultraviolet curable resin composition of the invention.

(ii) The optical member according to (i) above, in which the optical substrate having a light shielding portion is an optical substrate selected from the group consisting of a transparent glass substrate having a light shielding portion, a transparent resin substrate having a light shielding portion, and a glass substrate having a light shielding portion and a transparent electrode formed thereon, and the functional laminated body is a display body unit or a touch panel.

(iii) The optical member according to (ii) above, in which the display body unit is any one of a liquid crystal display unit, plasma display unit, and an organic EL display unit.

(iv) A touch panel (or a touch panel input sensor) obtained by bonding an optical substrate, which has a light shielding portion and is in a platy shape or sheet shape, to the surface of the touch surface side of the touch panel using the cured product of the ultraviolet curable resin composition of the invention.

(v) A display panel obtained by bonding an optical substrate, which has a light shielding portion and is in a platy shape or sheet shape, onto the display screen of the display body unit using the cured product of the ultraviolet curable resin composition of the invention.

(vi) The display panel according to (v) above, in which the optical substrate, which has a light shielding portion and is in a platy shape or sheet shape, is a protective substrate to protect the display screen of the display body unit, or a touch panel.

(vii) The optical member, touch panel, or display panel according to any one of (i) to (vi) above, in which the ultraviolet curable resin composition is the ultraviolet curable resin composition according to any one of (I) to (XII) above.

The optical member of the invention is obtained by bonding plural optical substrates selected from the respective optical substrates described above to one another through the method according to Processes 1 to 3 and Process 4 performed arbitrarily using the ultraviolet curable resin composition of the invention. In Process 1, the ultraviolet curable resin composition may be coated on only one surface of the surfaces facing each other via a cured product layer in two optical substrates to be bonded to each other, or may be coated on both of the surfaces.

For example, in the case of the optical member according to (ii) above, in which the functional laminated body is a touch panel or a display body unit, the resin composition may be coated on only either one or both of either surface of the protective substrate having a light shielding portion, preferably the surface provided with the light shielding portion, and the touch surface of the touch panel or the display surface of the display body unit in Process 1.

In addition, in the case of the optical member according to (vi) above, which is obtained by bonding a protective substrate to protect the display screen of the display body unit, or a touch panel to the display body unit, the resin composition may be coated on only either one or both of the surface provided with a light shielding portion of the protective substrate or the substrate surface opposite to the touch surface of the touch panel, and the display surface of the display body unit in Process 1.

A display body unit including an optical substrate having a light shielding portion, which is obtained by the producing method of the invention can be incorporated into an electronic device such as a TV set, a small game console, a mobile phone, and a personal computer.

EXAMPLES

Hereinafter, the invention will be described further specifically with reference to Examples, but the invention is not limited to these Examples.

Preparation of Ultraviolet Curable Resin Composition An ultraviolet curable resin composition A was prepared by heating and mixing 45 parts by weight of urethane acrylate (a reaction product obtained by reacting three components of polypropylene glycol (molecular weight of 3000), isophorone diisocyanate, and 2-hydroxyethyl acrylate at a mole ratio of 1:1.3:2), 25 parts by weight of UNISAFE PKA-5017 (Polyethylene glycol-polypropylene glycol allylbutyl ether, manufactured by NOF CORPORATION), 10 parts by weight of ACMO (acryloylmorpholine, manufactured by KOHJIN Holdings Co., Ltd.), 20 parts by weight of LA (lauryl acrylate, manufactured by OSAKA ORGANIC CHEMICAL INDUSTRY LTD.), and 0.5 part by weight of Speedcure TPO (2,4,6-trimethylbenzoyldiphenylphosphine oxide, manufactured by LAMBSON) (Ultraviolet curable resin composition A).

The following evaluations were performed using the ultraviolet curable resin composition A of the invention thus obtained.

Example 1

As illustrated in FIG. 1(a), the ultraviolet curable resin composition A thus prepared was coated on the display surface of a liquid crystal display unit 1 having an area of 3.5 inches and on the surface provided with a light shielding portion of a transparent glass substrate 2 having a light shielding portion 4 (width of 5 mm) such that the film thickness on each of the surfaces is 125 µm. Subsequently, each of the coating layers 5 thus obtained was irradiated with ultraviolet rays 9 having a cumulative amount of light of 2000 mJ/cm$^2$ from the atmosphere side using a high pressure mercury lamp (80 W/cm, ozone free) by interposing an ultraviolet shielding plate 6 in the region exposed to light at the time of bonding, and thus a coating layer in the light shielded region at the time of bonding was cured.

Next, as illustrated in FIG. 1(b), the liquid crystal display unit 1 and the transparent substrate 2 having a light shielding portion was bonded to each other in the form that the coating layers 7, of which each of the light shielded regions was cured, face each other. Finally, as illustrated in FIG. 1(c), the uncured coating layers were cured by irradiating the coating layers 7 with ultraviolet rays 9 having a cumulative amount of light of 2000 mJ/cm$^2$ from the side of the glass substrate 2 having a light shielding portion using a high pressure mercury lamp (80 W/cm, ozone free), thereby preparing the optical member of the invention (a liquid crystal display unit having a transparent glass substrate having a light shielding portion).

Example 2

As illustrated in FIG. 2(a), the ultraviolet curable resin composition A thus prepared was coated on a transparent glass substrate 2 which has an area of 3.5 inches and has a light shielding portion 4 (width of 5 mm) such that the film thickness of the resin composition is 250 μm. Subsequently, the coating layer 5 thus obtained was irradiated with ultraviolet rays 9 having a cumulative amount of light of 2000 mJ/cm$^2$ from the atmosphere side using a high pressure mercury lamp (80 W/cm, ozone free) by interposing an ultraviolet shielding plate 6 in the region exposed to light at the time of bonding, and thus a coating layer in the light shielded region at the time of bonding was cured.

Next, as illustrated in FIG. 2(b), the liquid crystal display unit 1 and the transparent substrate 2 having a light shielding portion was bonded to each other in the form that the coating layer 7 having a light shielded region cured in the transparent substrate 2 having a light shielding portion and the display surface of the liquid crystal display unit 1 face each other. Finally, as illustrated in FIG. 2(c), the uncured coating layer was cured by irradiating the coating layer 7 with ultraviolet rays 9 having a cumulative amount of light of 2000 mJ/cm$^2$ from the side of the glass substrate 2 having a light shielding portion using a high pressure mercury lamp (80 W/cm, ozone free), thereby preparing the optical member of the invention (a liquid crystal display unit having a transparent glass substrate having a light shielding portion).

Comparative Example 1

Figure 3:
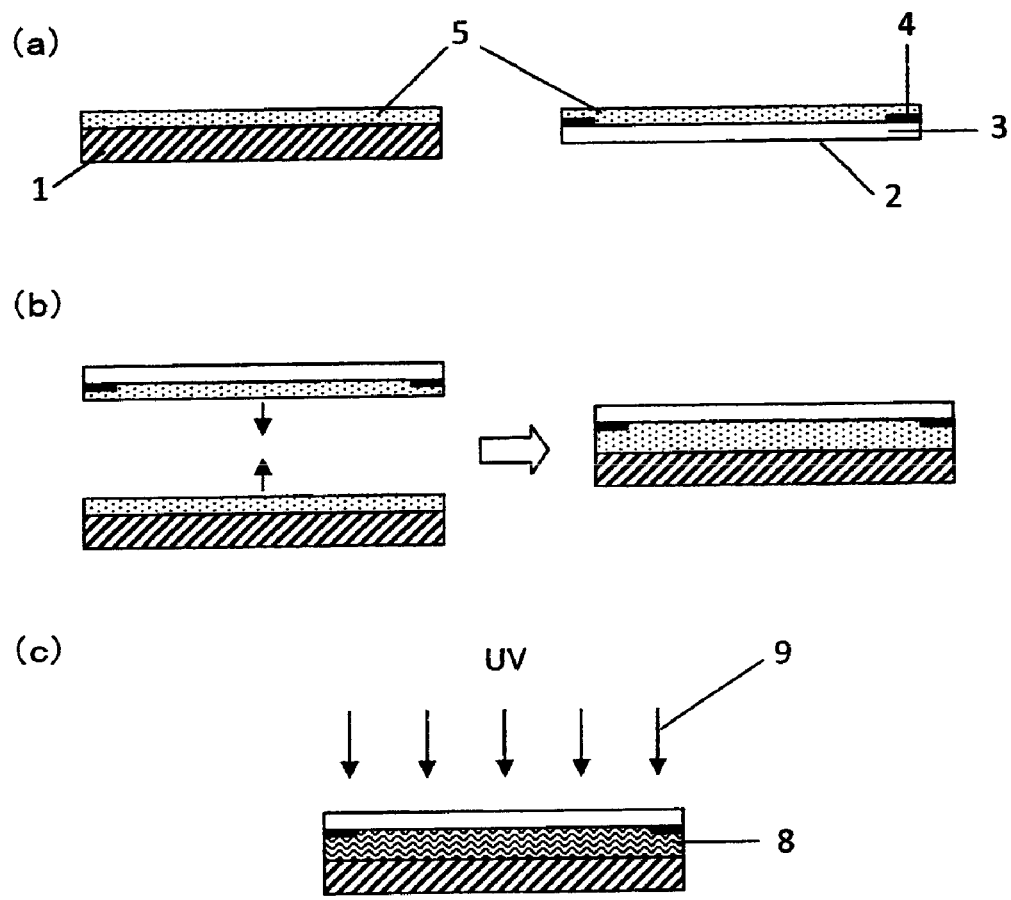
FIGS. 3(a) to 3(c) are process diagrams illustrating a producing process according to Comparative Example 1.

As illustrated in FIG. 3(a), the ultraviolet curable resin composition A thus prepared was coated on each of the display surface of a liquid crystal display unit 1 and the surface provided with the light shielding portion of a transparent glass substrate 2 having a light shielding portion 4 (width of 5 mm) such that the film thickness on each of the surfaces is 125 μm.

Next, as illustrated in FIG. 3(b), the liquid crystal display unit 1 and the transparent substrate 2 having a light shielding portion was bonded to each other in the form that the coating layers 5 face each other. Finally, as illustrated in FIG. 3(c), the coating layers were cured by irradiating the uncured coating layers with ultraviolet rays 9 having a cumulative amount of light of 2000 mJ/cm$^2$ from the side of the transparent glass substrate 2 having a light shielding portion using an extra-high pressure mercury lamp (TOSCURE 752, manufactured by TOSHIBA Lighting & Technology Corporation), thereby preparing the optical member of Comparative Example 1.

(Determination of Cure Extent)

The transparent substrate was detached from the optical member thus obtained, and then the cured product layer of resin in the light shielded region shielded from light by the light shielding portion, was washed away with isopropyl alcohol, thereby the uncured resin composition was removed. Thereafter, the cure extent was determined by confirming the cured state of the cured product layer of resin in the light shielded region. The evaluation of cure extent was performed based on the criteria below.

Cure Extent:

○ ... Cured (traces that the uncured resin composition has been removed cannot be confirmed.)

Δ ... Uncured (cured product remains, but traces that uncured resin composition have been removed can also be confirmed.)

X ... Not cured at all (cured product does not remain at all.)

TABLE 1

|  | Example 1 | Example 2 | Comparative Example 1 |
|---|---|---|---|
| Cure extent | ○ | ○ | X |

From the result above, it is verified that the cured product layer of resin in the light shielded region exhibited high cure extent although the cured product layer of resin was shielded from ultraviolet rays by the light shielding portion on the protective substrate in the optical member prepared by the producing method of the invention.

In addition, the following evaluations were performed using the ultraviolet curable resin composition A of the invention, which was obtained in the above.

(Curability)

Two pieces of slide glass having a thickness of 1 mm were prepared, and then the ultraviolet curable resin composition A thus obtained was coated on one piece of the two pieces so as to have a film thickness of 200 μm. The other piece of slide glass was bonded to the coated surface of the one piece. The resin composition was irradiated with ultraviolet rays having a cumulative amount of light of 2000 mJ/cm$^2$ using a high pressure mercury lamp (80 W/cm, ozone free) through the glass. The cured state of the cured product was confirmed by visual observation, and as a result, the cured product was completely cured.

(Cure Shrinkage)

Two pieces of slide glass, which were coated with a fluorine-based mold releasing agent and have a thickness of 1 mm, were prepared, and then the ultraviolet curable resin composition A thus obtained was coated on one piece of the two pieces so as to have a film thickness of 200 μm. Thereafter, the two pieces were bonded to each other such that the surfaces coated with mold releasing agent face each other. The resin composition was irradiated with ultraviolet rays having a cumulative amount of light of 2000 mJ/cm$^2$ using a high pressure mercury lamp (80 W/cm, ozone free) through the glass, thereby curing the resin composition. Thereafter, the two pieces of slide glass were separated from each other, thereby preparing a film of cured product for specific membrane gravity measurement.

The specific gravity (DS) of the cured product was measured based on JIS K7112 B method. In addition, the liquid specific gravity (DL) of the ultraviolet curable resin composition was measured at 25° C. From the measurement result of DS and DL, the cure shrinkage was calculated by the following Expression. As a result, the cure shrinkage was less than 2.0%.

Cure shrinkage (%)=(DS−DL)/DS·100

(Adhesiveness)

A slide glass having a thickness of 0.8 mm and an acrylic plate having a thickness of 0.8 mm were prepared. The ultraviolet curable resin composition A thus obtained was coated on one of the two so as to have a film thickness of 200 μm, and then the other was bonded to the coating surface of the one. The resin composition was irradiated with ultraviolet rays having a cumulative amount of light of 2000 mJ/cm$^2$ using a high pressure mercury lamp (80 W/cm, ozone free) through the glass, thereby curing the resin composition. A sample for adhesiveness evaluation was prepared in this manner. This sample was left to stand at 85° C. under an environment of 85% RH for 250 hours. The flaking of cured product of resin of the slide glass or the acrylic plate was confirmed by visual observation in the sample for evaluation, and as a result, flaking did not occur.

(Flexibility)

The ultraviolet curable resin composition A thus obtained was sufficiently cured, and the durometer hardness E was measured by a method based on JIS K7215 using a durometer hardness tester (type E), thereby evaluating the flexibility. More specifically, the ultraviolet curable resin composition A was poured into a mold of cylindrical shape so as to have a film thickness of 1 cm, and then the resin composition was irradiated with ultraviolet rays, thereby sufficiently curing the resin composition. The hardness of the cured product thus obtained was measured using a durometer hardness tester (type E). As the result, the measured value was less than 10, and hence it is verified that the cured product exhibits excellent flexibility.

(Transparency)

Two pieces of slide glass, which were coated with a fluorine-based mold releasing agent and have a thickness of 1 mm, were prepared, and then the ultraviolet curable resin composition thus obtained was coated on one piece of the two pieces so as to have a film thickness of 200 μm. Thereafter, the two pieces were bonded to each other such that the surfaces coated with mold releasing agent face each other. The resin composition was irradiated with ultraviolet rays having a cumulative amount of light of 2000 mJ/cm$^2$ using a high pressure mercury lamp (80 W/cm, ozone free) through the glass, thereby curing the resin composition. Thereafter, the two pieces of slide glass were separated from each other, thereby preparing a cured product for transparency measurement.

With regard to the transparency of the cured product thus obtained, the transmittance in wavelength regions of from 400 to 800 nm and from 400 to 450 nm was measured using a spectrophotometer (U-3310 manufactured by Hitachi High-Technologies Corporation). As the result, the transmittance at from 400 to 800 nm was 90% or more and the transmittance at from 400 to 450 nm was also 90% or more.

REFERENCE SIGNS LIST

1 Liquid crystal display unit, 2 Transparent substrate having a light shielding portion, 3 Transparent substrate, 4 Light shielding portion, 5 Coating layer of ultraviolet curable resin composition, 6 Ultraviolet shielding plate (UV mask), 7 Coating layer of ultraviolet curable resin composition having a light shielded region cured at the time of bonding, 8 Cured product layer of resin, 9 Ultraviolet rays

The invention claimed is:

1. A method of producing an optical member including at least a pair of optical substrates, in which both of a transparent optical substrate having a light shielding portion on a surface thereof and another optical substrate to be bonded to the transparent optical substrate having a light shielding portion on a surface thereof are bonded to each other through a procedure including the following Process 1 to Process 3 using an ultraviolet curable resin composition, the method comprising:

Process 1: a process of forming a coating layer by coating the ultraviolet curable resin composition on at least either of bonding surfaces of the transparent optical substrate having a light shielding portion on a surface thereof and another optical substrate to be bonded to the transparent optical substrate, and then allowing the coating layer to have a light shielded region selectively cured and the other part uncured by selectively irradiating the light shielded region, to be described below, in the coating layer thus obtained with ultraviolet rays in the air or in the presence of a curing inhibitory gas, wherein a surface of the coating layer in the other part uncured and a surface of the coating layer in the light shielded region where stickiness is preserved are obtained as a bonding surface, in which the light shielded region described above means a part of coating layer where ultraviolet rays do not reach since the part is shielded from ultraviolet rays by a light shielding portion when the two optical substrates are bonded to each other and the coating layer is irradiated with ultraviolet rays through the transparent optical substrate having a light shielding portion on the surface thereof;

Process 2: a process of bonding the two optical substrates to each other by interposing the coating layer obtained in Process 1 between the bonding surfaces of the two optical substrates; and Process 3: a process of curing the uncured coating layer, which is interposed between the two optical substrates, by irradiating a laminated body having at least a pair of optical substrates bonded to each other by Processes 1 and 2 with ultraviolet rays through the transparent optical substrate having a light shielding portion.

2. The method of producing an optical member according to claim 1, the method further comprising the following Process 4 after Process 3, Process 4: a process of applying pressure with respect to the optical substrates bonded to each other.

3. The method of producing an optical member according to claim 1, wherein the part, which is a part other than the light shielded region of the coating layer and is to remain as uncured, is masked with an ultraviolet shielding plate and irradiation with ultraviolet rays is performed when the light shielded region is cured in Process 1.

4. The method of producing an optical member according to claim 1, wherein an irradiation dose of ultraviolet rays in Process 1 is at least 200 mJ/cm$^2$.

5. The method of producing an optical member according to claim 1, wherein the ultraviolet curable resin composition is coated at least either a surface provided with a light shielding portion of the optical substrate having a light shielding portion on a surface thereof or a display surface of a display unit that is the optical substrate to be bonded to the optical substrate having a light shielding portion on a surface thereof, and the optical substrate having a light shielding portion on a surface thereof and the display unit are bonded to each other such that a surface of the side having a light shielding portion of the optical substrate having a light shielding portion on a surface thereof and the display surface of the display unit face each other by interposing a coating layer thus obtained in Process 1.

6. The method of producing an optical member according to claim 1, wherein the optical substrate having a light shielding portion on a surface thereof is at least one selected from the group consisting of a transparent glass substrate having a light shielding portion, a transparent resin substrate having a light shielding portion, a glass substrate having a light shielding portion and a transparent electrode formed thereon, and the optical substrate to be bonded to the optical substrate having a light shielding portion on a surface thereof is at least one selected from the group consisting of a liquid crystal display unit, a plasma display unit, and an organic EL display unit.

7. The method of producing an optical member according to claim 1, wherein the ultraviolet curable resin composition is an ultraviolet curable resin composition including (A) a (meth)acrylate and (B) a photopolymerization initiator.

8. The method of producing an optical member according to claim 7, wherein (A) the (meth)acrylate is at least one selected from the group consisting of a urethane (meth)acrylate, a (meth)acrylate having a polyisoprene backbone, and a (meth)acrylate monomer.

9. The method of producing an optical member according to claim 8, wherein both of (i) a urethane (meth)acrylate or a (meth)acrylate having a polyisoprene backbone and (ii) a (meth)acrylate monomer are included as (A) the (meth)acrylate.

10. The method of producing an optical member according to claim 8 or 9, wherein (A) the (meth)acrylate is a urethane (meth)acrylate having a polypropylene oxide structure or a (meth)acrylate monomer.

11. The method of producing an optical member according to claim 10, wherein the urethane (meth)acrylate is a urethane (meth)acrylate obtained by reacting polypropylene glycol, polyisocyanate, and a hydroxyl group-containing (meth)acrylate.

12. The method of producing an optical member according to claim 8 or 9, wherein a weight average molecular weight of the urethane (meth)acrylate is from 7000 to 25000, and a number average molecular weight of the (meth)acrylate having a polyisoprene backbone is from 15000 to 50000.

13. The method of producing an optical member according to claim 8 or 9, wherein the ultraviolet curable resin composition includes other components other than (A) the (meth)acrylate and (B) the photopolymerization initiator, and includes a urethane (meth)acrylate at from 20 to 80% by weight and a (meth)acrylate monomer at from 5 to 70% by weight with respect to the total amount of the ultraviolet curable resin composition as (A) the (meth)acrylate, and (B) the photopolymerization initiator at from 0.2 to 5% by weight with respect to the total amount of the ultraviolet curable resin composition, and the balance is other components.

14. An optical member obtained by the method of producing an optical member according to any one of claim 1, 3, or 8.

15. A touch panel obtained by the method of producing an optical member according to claim 1.

16. A display device, which is obtained by the method of producing an optical member according to claim 5 and has an optical substrate having a light shielding portion on a surface thereof on a display screen of a display unit.

17. Use of an ultraviolet curable resin composition including (A) a (meth)acrylate and (B) a photopolymerization initiator for the method of producing an optical member according to any one of claims 1 to 5.

18. The use of an ultraviolet curable resin composition according to claim 17, wherein (A) the (meth)acrylate is at least one selected from the group consisting of a urethane (meth)acrylate, a (meth)acrylate having a polyisoprene backbone, and a (meth)acrylate monomer.

19. The use of an ultraviolet curable resin composition according to claim 17, wherein both of (i) a urethane (meth)acrylate or a (meth)acrylate having a polyisoprene backbone and (ii) a (meth)acrylate monomer are included as (A) the (meth)acrylate.

20. The use of an ultraviolet curable resin composition according to claim 18, wherein the urethane (meth)acrylate is a urethane (meth)acrylate obtained by reacting polypropylene glycol, polyisocyanate, and a hydroxyl group-containing (meth)acrylate.

21. An ultraviolet curable resin composition to be used in the method of producing an optical member according to claim 1, the composition comprising (A) a (meth)acrylate and (B) a photopolymerization initiator.

22. The ultraviolet curable resin composition according to claim 21, wherein (A) the (meth)acrylate is at least one selected from the group consisting of a urethane (meth)acrylate, a (meth)acrylate having a polyisoprene backbone, and a (meth)acrylate monomer.

23. The method of producing an optical member according to claim 7, wherein the ultraviolet curable resin composition is an ultraviolet curable resin composition further including a softening component.

24. The ultraviolet curable resin composition according to claim 21, the composition further comprising a softening component.

25. An optical member obtained by the method of producing an optical member according to claim 12.

* * * * *